(12) United States Patent
Sidagni

(10) Patent No.: US 9,800,603 B1
(45) Date of Patent: Oct. 24, 2017

(54) SELF-REPLICATING DISTRIBUTED VULNERABILITY MANAGEMENT AGENT APPARATUSES, METHODS, AND SYSTEMS

(71) Applicant: NopSec Inc., New York, NY (US)

(72) Inventor: Michelangelo Sidagni, New York, NY (US)

( * ) Notice: Subject to any disclaimer, the term of this patent is extended or adjusted under 35 U.S.C. 154(b) by 195 days.

(21) Appl. No.: 14/675,380

(22) Filed: Mar. 31, 2015

Related U.S. Application Data

(60) Provisional application No. 61/972,710, filed on Mar. 31, 2014.

(51) Int. Cl.
  *G06F 21/00* (2013.01)
  *H04L 29/06* (2006.01)
  *G06F 9/445* (2006.01)

(52) U.S. Cl.
  CPC ............ *H04L 63/1433* (2013.01); *G06F 8/65* (2013.01)

(58) Field of Classification Search
  CPC ............... G06F 21/577; H04L 63/1433; H04L 63/1416; H04L 63/20; H04L 63/1408
  USPC .......................................................... 726/25
  See application file for complete search history.

(56) References Cited

U.S. PATENT DOCUMENTS

2013/0198848 A1\* 8/2013 Wolff .................... G06F 21/568
                                                              726/25

\* cited by examiner

*Primary Examiner* — Baotran N To
(74) *Attorney, Agent, or Firm* — Kenneth L. Johnson; Norton Rose Fulbright US LLP

(57) ABSTRACT

A controlled vulnerability management agent programmable to arm itself and attempt to propagate and extract vulnerabilities from a target network, without input from a user. The agent may also send status and vulnerability information to a unified vulnerability resource management (unified VRM) platform, and may also have the ability to fix vulnerabilities through a real-time control center associated with the unified vulnerability resource management platform.

22 Claims, 16 Drawing Sheets

SELF-REPLICATING DISTRIBUTED VULNERABILITY MANAGEMENT AGENT APPARATUSES, METHODS, AND SYSTEMS

PRIORITY CLAIM

This application claims priority under 35 U.S.C. §119 to U.S. Provisional Patent Application No. 61/972,710, filed Mar. 31, 2014, the contents of which are incorporated by reference herein in their entirety.

FIELD

The present invention is directed generally to vulnerability detection and remediation. More particularly, the invention is directed to SELF-REPLICATING DISTRIBUTED VULNERABILITY MANAGEMENT AGENT APPARATUSES, METHODS, AND SYSTEMS (hereinafter RVMA).

BACKGROUND

The fight against malware is constant. Malware is malicious software that alters or harms a host computer and often spreads from one device to another across networks. No matter how carefully a program is developed, it will inevitably have vulnerabilities and security flaws, which unscrupulous actors will eagerly exploit to gain unauthorized access to the program and often to inject malware to hijack, destroy, or otherwise alter the program. Because malware is constantly evolving, new methods and systems of combating its spread and preventing any harm it may cause are needed.

SUMMARY

A processor-implemented method for propagating a self-propelling distributed vulnerability management bot through a target network without user input is disclosed. The method includes: scanning at least a portion of the target network to identify at least one node on the network with at least one vulnerability; exploiting the at least one vulnerability to install an implant of the self-propelling bot in memory on the at least one node; instantiating a stager on the at least one node using the implant; downloading a module from a vulnerability resource management server outside the target network using the stager; installing the module in memory on the at least one node to provide additional functionality to the implant; detecting additional vulnerabilities on the at least one node using the downloaded module; transmitting the additional vulnerabilities to the vulnerability resource management server; downloading a patching module from the vulnerability resource management server; installing the patching module in memory on the at least one node; and applying patches, using the patching module, to the at least one node to correct the at least one vulnerability and the additional vulnerabilities.

A system for propagating a self-propelling distributed vulnerability management bot through a target network without user input is also disclosed. The system includes a target network having a plurality of nodes, with at least a portion of the nodes being exploitable nodes; a vulnerability resource management server in communication with the target network; a plurality of implants of the self-propelled bot installed in memory on each of the exploitable nodes; at least one control post in communication with the vulnerability resource management server; and at least one listening post communicatively disposed between the control post and the implants to form part of a communication channel between the implants and the vulnerability resource management server.

A processor-readable tangible medium for propagating a self-propelling distributed vulnerability management bot through a target network without user input is also disclosed. The medium stores processor-issuable-and-generated instructions to: scan at least a portion of the target network to identify at least one node on the network with at least one vulnerability; exploit the at least one vulnerability to install an implant of the self-propelling bot in memory on the at least one node; instantiate a stager on the at least one node using the implant; download a module from a vulnerability resource management server outside the target network using the stager; install the module in memory on the at least one node to provide additional functionality to the implant; detect additional vulnerabilities on the at least one node using the downloaded module; transmit the additional vulnerabilities to the vulnerability resource management server; download a patching module from the vulnerability resource management server, the patching module being configured to correct the at least one vulnerability and the additional vulnerabilities; install the patching module in memory on the at least one node; and apply patches, using the patching module, to the at least one node to correct the at least one vulnerability and additional vulnerabilities.

BRIEF DESCRIPTION OF THE DRAWINGS

The accompanying drawings and appendices illustrate various non-limiting, exemplary, inventive aspects in accordance with the present disclosure.

DETAILED DESCRIPTION

Figure 1:
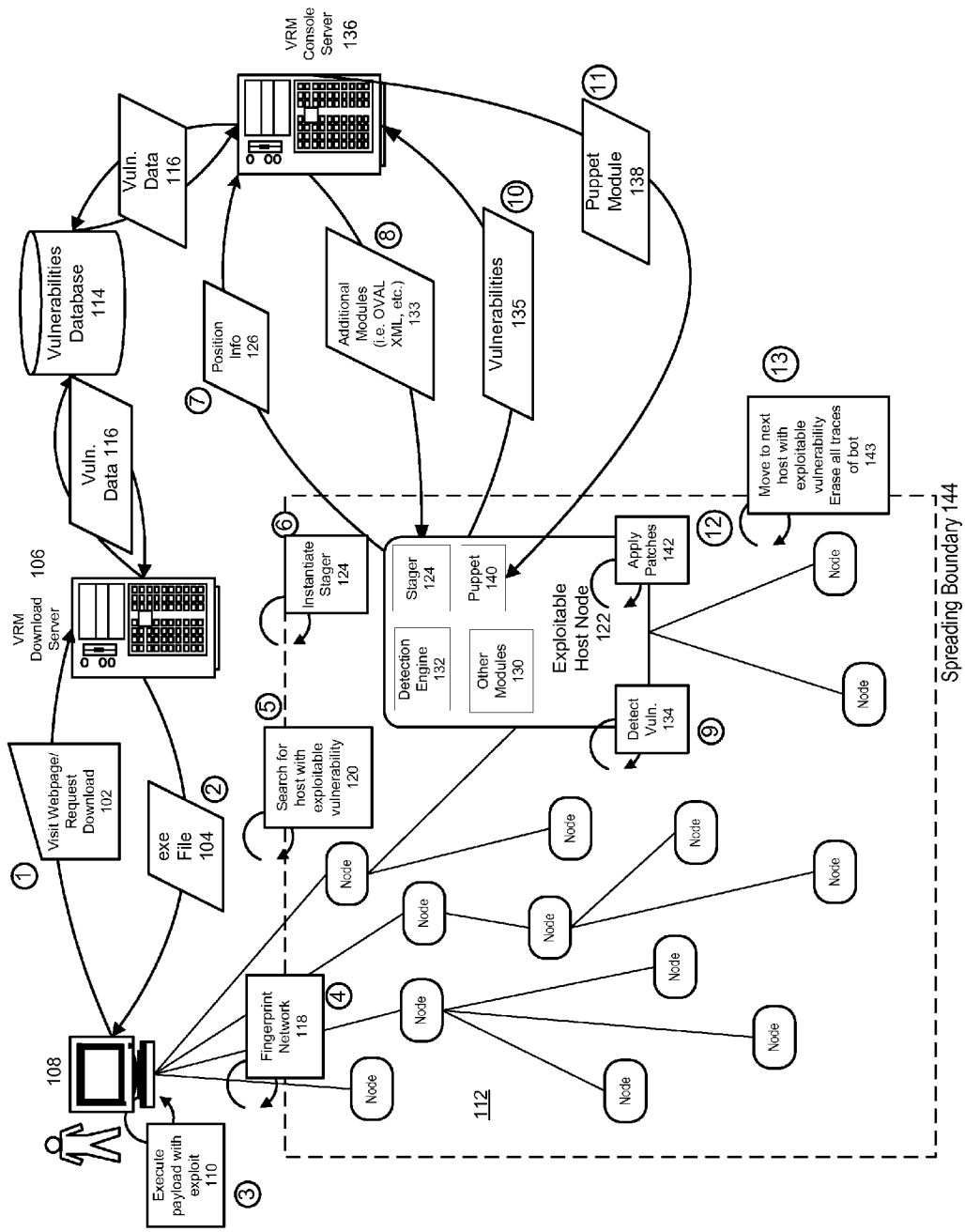
FIG. 1 shows a schematic illustration of data flows between RVMA components and affiliated entities in one embodiment of RVMA operation.

This disclosure describes a Self-Replicating (Self-Propelling) Distributed Vulnerability Management Agent (RVMA) as well as associated apparatuses, systems, and methods. The RVMA may be a controlled/retrained/benign software agent that arms itself and attempts to propagate and assess vulnerabilities in host nodes in a network that it visits. The RVMA may also send status and vulnerability information to a unified vulnerability resource management (unified VRM) platform, and may also have the ability to fix vulnerabilities through a real-time control center associated with the unified VRM platform. The initial pivoting into the host node may happen through a memory-resident stager, that downloads other modules for enhanced functionalities.

The RVMA described in this disclosure is analogous to an antibody or white blood cell in the body. Just as the antibody identifies and neutralizes bacteria, viruses, and other foreign objects that may be harmful to the human body, the RVMA may be configured to automatically detect and neutralize threats to a network from malware such as computer viruses, ransomware, worms, Trojan horses, rootkits, keyloggers, dialers, spyware, adware, malicious Browser Helper Objects (BHOs), rogue security software, govware, and other malicious programs. In one exemplary embodiment, the RVMA mimics malware by reproducing itself and spreading through a network. But the RVMA is configured to detect and patch vulnerabilities rather than exploit them. The RVMA may be configured to operate based on boundaries and rules defined by a user.

In one embodiment, the RVMA may be configured to interface with the unified vulnerability risk management (VRM) platform having a VRM control panel accessible through the internet, or any other suitable network. Examples of such a unified VRM management platform are described in U.S. Pat. No. 8,756,698 and U.S. Pat. No. 8,813,235, the contents of which are incorporated by reference herein. In one exemplary embodiment, a user may establish bindings and restraints for the RVMA within the unified VRM control panel. These restraints may be subject to approval from a vulnerability management service provider. Once approval has been given, the RVMA may be available for download to one or more host assets. Examples of assets include desktop computers, laptop computers, servers, routers, workstations, smartphones, tablets, and any other suitable device. The user may then monitor the propagation and status of an RVMA bot, which may be configured to spread throughout the network collecting vulnerability and other contextual information without any further user intervention or control, although the RVMA bot would operate only according to the bindings and restraints established by the user through the VRM control panel. A dashboard within the VRM control panel may be provided to the user for real-time monitoring and control the RVMA bot as it propagates. In one exemplary embodiment, the RVMA bot is a software application that runs on the host assets, spreads to other assets on a network, and performs certain operations.

User configuration of the RVMA through the control panel may include the following: domain boundaries, time boundaries, asset type restraints, system utilization restraints (max memory and processor use, for example), exploit type restraints, vulnerability detection type restraints, exfiltration restraints (how information passes through a firewall and intrusion detection systems), Command and Control (C2) channel protocols (HTTPS, DNS, ICMP, Twitter, LinkedIn, Facebook, etc.), and other suitable configurations.

The control panel may also provide status information, such as current location of the RVMA bot, location details, operating system details, application information, hardware and software information, pass and fail status for checks and exploits, exploits downloaded by the RVMA bot, MITRE OVAL (Open Vulnerability Assessment Language) definitions download and open source local vulnerability assessment definitions, vulnerabilities detected, time, origin, replication ID, configuration updates, and other relevant information.

The control panel may also provide the user with real-time control of the propagation of the RVMA bot, providing, for example, a kill switch, button, or other means to terminate all instances of the RVMA bot, and functionality for monitoring the propagation of the RVMA bot in real time and updating the configuration of the RVMA.

The user may also be able to apply patches and changes to the system using the VRM control panel. The VRM control panel may connect to WSUS (Windows Server Update Services) and other patch systems to compare the status of the patching and vulnerabilities. In one exemplary embodiment, the RVMA may provide automated remediation based on the vulnerabilities found by the RVMA. This feature may be customizable by the user based on risk tolerance, for example.

Because the RVMA is self-replicating and can propagate when new targets make themselves available, the RVMA may be used to continuously monitor a user's internal network and apply patches and reconfigurations as needed to assets within the ecosystem that fall within the configuration parameters of the RVMA, as set by the user.

Figure 2:
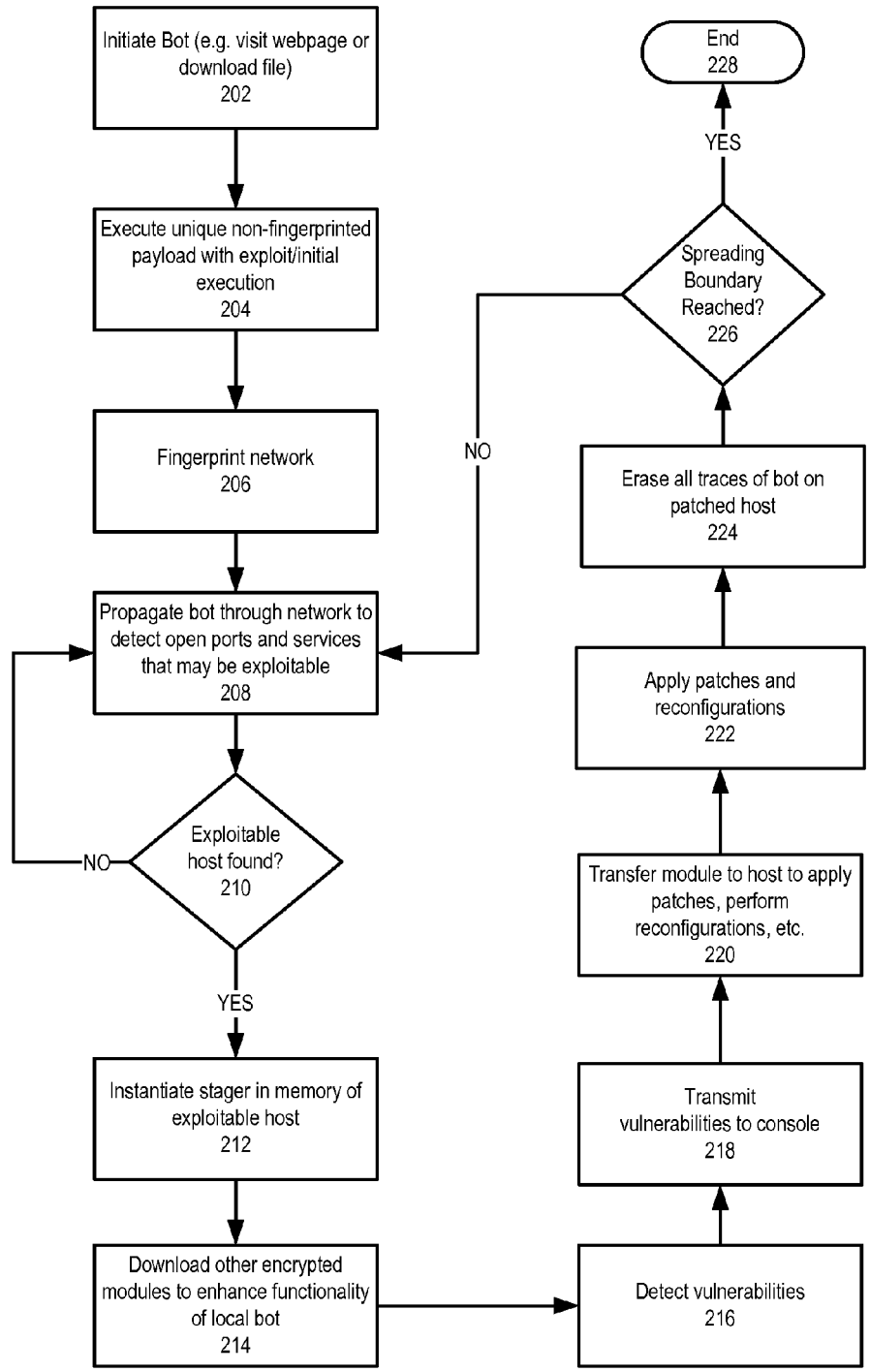
FIG. 2 shows an exemplary logic flow in one embodiment of RVMA operation.

FIG. 1 shows a schematic illustration of data flows between RVMA components and affiliated entities in one embodiment of RVMA operation. FIG. 2 shows an exemplary logic flow in one embodiment of a method of RVMA operation. In one embodiment, the RVMA includes a self-propelling RVMA bot that seeks out vulnerabilities within the nodes of a target network. A node is an electronic device on a network capable of creating, receiving, or transmitting information over a communications channel.

As shown in FIG. 1, to initiate the RVMA bot, a user may visit a webpage 102 and perform an action that requests an executable file 104 from a VRM Server 106. Executable file 104 is then loaded onto the user's device 108. The user may download executable file 104 using any suitable means, for example by clicking on link or a button in a designated area of a VRM control panel, or simply by visiting a designated webpage.

The executable file may then be executed 110 on the user's device 108 or on another device designated by the user. In one exemplary embodiment, once it has been executed, the RVMA bot deletes executable file 104 from the file system in the device on which it was installed so that no trace of executable file 104 remains and the RVMA bot itself resides only in memory of the device it was installed on.

In one exemplary embodiment, the bot incorporates itself into another running process. The bot may then execute 110 a unique, non-fingerprinted payload with the exploit/initial execution. The RVMA may then propel or propagate the RVMA bot through a target network 112, searching for a host node with an exploitable vulnerability. This vulnerability may be stored in a vulnerabilities database 114 that passes vulnerability data 116 to various parts of the RVMA. As vulnerability database 114 is updated with information relating to newly discovered vulnerabilities, this new information may be communicated to VRM download server 106 and incorporated into executable file 104 so that new vulnerability information is propagated to the target network when the payload is executed at 110.

In one exemplary embodiment, target network 112 may be fingerprinted at 118 to determine characteristics of nodes on the target network, including operating system and other relevant information. The RVMA bot may then propagate through the nodes of target network 112, searching for a host node with an exploitable vulnerability, as shown at 120.

The RVMA bot may propagate through the target network using any number of vectors, including: publicly available exploits for Windows operating systems or Linux operating systems (available from penetration testing software such as Metasploit and exploitdb); open administrative shares; LSASS (Local Security Authority Subsystem Service) hashes passing found in the initial and subsequent hosts; hashes collected via fake SMB (Server Message Block) share; collection of Kerberos tickets via the mimikatz tool, up until the "golden ticket" is collected; and port scanning/target exploitation. In one exemplary embodiment, when the RVMA bot hits a dead end, that is, when it is no longer able to propagate through the target network, the RVMA may use a zero-day vulnerability, that is, a vulnerability that is unknown to the developer who produces the software, to continue propagating through the network. The RVMA may include one or more zero-day vulnerabilities for each of the operating system it is likely to encounter (Windows and Linux, for example).

Once a host node 122 with an exploitable vulnerability is found, the RVMA bot may execute a specific exploit. In one exemplary embodiment, the exploit may be obfuscated, meaning that the exploit may be packed and encoded to bypass detection by an Intrusion Detection System (IDS). The exploit may be configured to deliver a novel/polymorphic payload that instantiates a stager in memory on the host, as shown at 124. In another embodiment, the payload may be somewhat polymorphic based on a random value. Once it has been instantiated, the stager may then be immediately moved to an existing running process. The RVMA bot may then transmit its position information, as shown at 126, to the VRM central console and indicate that a vulnerability has been successfully exploited.

The stager 128 may then download other encrypted modules, as shown at 130, to enhance the functionality of the local RVMA bot. For example, the bot may download an Open Vulnerability and Assessment (OVAL)-based vulnerability detection engine module 132 and the OVAL XML vulnerability signatures for the specific operating system that has been fingerprinted, as shown at 133. When the RVMA bot detects a vulnerability, as shown at 134, that vulnerability 135 may be transmitted to a VRM console server 136, which may provide the user with access to and control of the RVMA bot through a user control panel. In one exemplary embodiment, the control panel is a secure webpage accessible to the user.

One of the first functions that the RVMA bot may perform on the host is to determine where the RVMA bot landed. In one exemplary embodiment, the RVMA bot performs a full system fingerprint and full domain and AD (Active Directory) fingerprint. After this fingerprint, the RVMA bot may download the OVAL interpreter in memory and the adequate OVAL definitions in encrypted and compressed format. The RVMA bot may then perform a vulnerability check by running the MITRE OVAL definitions, which may be local vulnerability checks written in XML (eXtensible Markup Language) and based on the system and application fingerprinting based on the CPE (Common Product Enumeration) standard. The RVMA bot may then transmit then transmits the identified vulnerabilities back to the VRM console server.

Although FIG. 1 shows the VRM console server and the VRM download server as two separate servers, it should be understood that the VRM download functionality and the console functionality may be implemented on a single server or across multiple servers. Both the VRM download server and the VRM console server may be in communication with vulnerabilities database 114, which contains vulnerabilities data 116 with information regarding vulnerabilities as well as patches and reconfigurations to address the found vulnerabilities.

As shown in FIG. 1 at 138, once the vulnerabilities have been identified, the VRM console server may transfer a module, sometimes known as a "puppet" agent, or puppet module 140 to apply patches, perform reconfigurations, and otherwise remediate the identified vulnerabilities found on the host node of the network, as shown at 142. As shown at 143, the RVMA bot may then propagate to the next host with an exploitable vulnerability on target network 112. In one embodiment, the RVMA bot erases all traces of itself on the host node. In another embodiment, the RVMA bot may remain on the host node for to detect and remediate additional vulnerabilities.

The RVMA bot can also fix identified vulnerabilities. For example, the RVMA bot may check back with the VRM console server, which can access dictionaries of publicly known information security vulnerabilities such as the CVE (Common Vulnerabilities and Exposures), and which syncs with WSUS and other patch management solutions to find the patch that fixes the identified vulnerability. In one exemplary embodiment, the puppet module 140 can push required patches to the exploitable host. In one exemplary embodiment, these security patches are deployed automatically, without any human intervention. In another exemplary embodiment, the user, through the VRM console, can decide to deploy the security patches with a click of a button.

The RVMA bot may use common protocols to communicate with the nodes in target network 112 and the VRM console, including, but not limited to: HTTPS (Hypertext Transfer Protocol Secure), ICMP (Internet Control Message Protocol), DNS (Domain Name System), SSH (Secure Shell), and the like. The RVMA bot may also use out-of-band command of control communication protocols such as Twitter, Facebook, LinkedIn, and the like.

In one exemplary embodiment, before launching the RVMA bot, the user may be able to configure the bot with a wizard that lets the user define the bot's network-spreading boundary 144, the policies, the allowed operating systems, the allowed vulnerabilities, the preferred exploits/communication protocols, the blacklisting internet protocol (IP) addresses, the whitelisting networks, and the like.

Through the console, the user may also have access to a "kill button," allowing for the instantaneous deletion of all RVMA bot memory instances present in target network 112. The RVMA bot may also be capable of finding zero-day vulnerabilities in web applications (SQL injections, command injections, etc.) allowing it to self-inject and execute the stager into memory for the purpose of executing the stager and downloading modules with additional functionality. The spreading and vulnerability checking may continue indefinitely with new exploits and vulnerability definitions until either the kill button is activated or no more nodes in the target network are exploitable with the existing exploit database. As new vulnerabilities are discovered, the RVMA bot may periodically propagate itself through the network once again to determine which nodes may be susceptible to the new vulnerabilities.

In one exemplary embodiment, the RVMA bot continues propagating through the target network by gathering hashes and with Kerberos tickets and other credentials from the hosts on the target network to try to spread to other hosts. At the same time, as the RVMA bot gets deeper into the target network, it may try to gather more information on the network infrastructure itself, including AD and domain servers, LDAP (Lightweight Directory Access Protocol), DNS (Domain Name System), DHCP (Domain Host Configuration Protocol) servers, SQL (Structured Query Language) servers and other pieces of critical infrastructure relevant to the target network.

If the RVMA bot cannot spread by these means, it may try to spread by public exploits, default passwords, and default read/write SNMP (Simple Network Management Protocol) community strings and more. The RVMA bot can be configured to spread on any type of operating system, including Windows, Linux, and Unix, as well as on any type of device on the target network, including routers and switches. If the RVMA bot cannot spread by these additional means, it may be configured to implement zero-day exploits.

Through the VRM console, a user may be able to determine when the RVMA bot will stop propagating through the target network. In addition to the "kill switch" functionality, which stops the propagation of the RVMA bot and erases all local instances of the bot from the host nodes, the VRM console may also be configured to allow the user to define the mission scope. In other words, the user may enter a number that defines the percentage of visits compared to the total host nodes in the target network. Once this percentage of visits has been reached, the RVMA bot can be configured to stop propagating through the target network.

The RVMA bot may also transmit data back to the VRM console to provide monitoring and reporting to the user. Through the VRM console, the user may monitor the progress of the RVMA bot in real time through a graphical network chart or other elements of a graphical user interface. The VRM console may also be configured to provide other reports or metrics, including: details of visited hosts with percentage of total hosts visited; "kill chains" and network roaming paths; vulnerabilities detected and recommendations; patches applied manually and patch differential analysis; flight time analysis for mission completion; and any other suitable report or metric.

In one exemplary embodiment, the code for implementing the RVMA bot is written in Python, although other suitable computer languages may also be used to write the underlying code.

FIG. 2 shows an exemplary logic flow 200 of one embodiment of RVMA operation. As shown in FIG. 2, at 202, the RVMA bot is initiated when a user visits a webpage or downloads an executable file. At 204, the executable file with a unique non-fingerprinted payload with an exploit is executed on the user's device or on another device designated by the user, which propagates an RVMA bot through the target network. At 206, the target network may be fingerprinted to determine the operating system and other relevant information relating to the devices that make up the nodes of the target network. At 208, the RVMA bot propagates through the network to detect open ports and services on the node devices that may be exploitable. As shown at 210, if no exploitable host is found, the RVMA bot continues to search for exploitable nodes.

At 212, when an exploitable node device is found, the RVMA bot instantiates a stager in memory of the exploitable host and at 214 downloads other encrypted modules to enhance functionality of the local version of the RVMA bot on the exploitable node. At 216, vulnerabilities are detected on the exploitable node, which are then transmitted through the target network back to a vulnerability management console at 218. Based on the vulnerability information transmitted through the network, the modules are sent to the exploitable node to apply patches and perform reconfigurations to address the vulnerability, as shown at 220 and 222.

Once the vulnerability has been patched or otherwise addressed, the RVMA bot may erase all traces of itself on the patched host node, as shown at 224. Alternatively, the RVMA bot may remain in memory on the host node to detect other vulnerabilities and apply patches or take other measures as needed. As the RVMA bot spreads through the host network, it may determine whether the spreading boundary has been reached, as shown at 226. If the spreading boundary, as defined by the user, has not been reached, the RVMA bot will continue to propagate through the target network. If the spreading boundary has been reached, the RVMA bot will no longer propagate and the process ends, as shown at 228 in FIG. 2.

Figure 3:
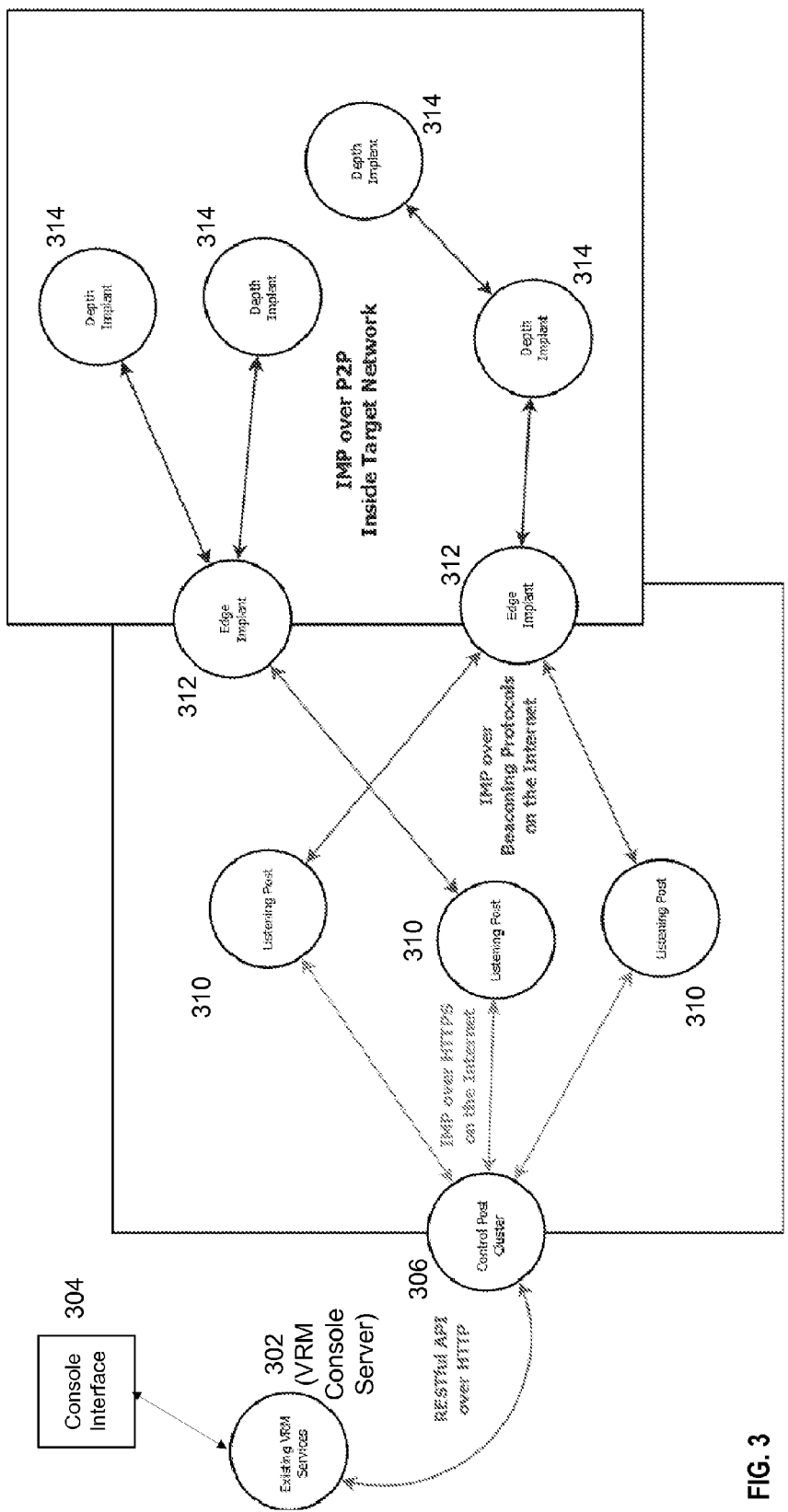
FIG. 3 is a schematic representation of and exemplary embodiment of the RVMA.

FIG. 3 is a schematic representation of and exemplary embodiment of the RVMA 300, showing communication channels between various parts of the RVMA. In the exemplary embodiment shown, a user device accesses a VRM console server 302 through a VRM console interface 304. The VRM console server 302 may communicate with a control post 306 via a Representational State Transfer Application Programming Interface (RESTful API) over HTTP (Hypertext Transfer Protocol). Control post 306 may be configured to feed information it receives from the RVMA bot embedded within a target network 308, by creating tickets, adding hosts, and creating implant action logs. As shown in FIG. 3, the RVMA may also include one or more listening posts 310, one or more edge implants 312, and one or more depth implants 314. Edge implants 312 and depth implants 314, which will be described in greater detail below, are local instances of the RVMA bot, embedded within target network 308. These implants 312 and 314 send information to the listening posts 310, which aggregate and store the information so that it can be sent to control post 306, which in turn transmits the information to VRM console server 302.

Through the VRM console interface, the user may be able to monitor the propagation of the RVMA bot through the target network. For example, the VRM console may be configured to allow the user to view host profiles, that is, technical information gathered about each host (such as IP configuration, operating system details, and the like). Host profile data may be downloaded from control post cluster 204 via the RESTful API. The VRM console may also be configured to allow a user to review tickets created for issues with a given host, for example, the vulnerabilities found within that host. Tickets may be created by control post cluster 204 as a scan is completed.

The VRM console may also be configured to allow a user to view implant action logs, that is, review logs of actions taken by implants under the direction of the control post (i.e. scanned files, collected files, OVAL checks performed and their results). These logs may be accessed via the RESTful API.

The VRM console may also be configured to allow a user to download a seed implant. When starting a new VRM scan, the customer may download a seed implant to run on their systems. This is generated at the control post and may be downloaded via the RESTful API.

The VRM console may also be configured to allow a user to send suspend or uninstall commands. If the user requires that a scan end early, or if the user does not want a scan to run during certain times, the user may use the existing VRM console interface to suspend operations or completely uninstall the implants. This is information may be passed to the control post via the RESTful API.

Figure 4:
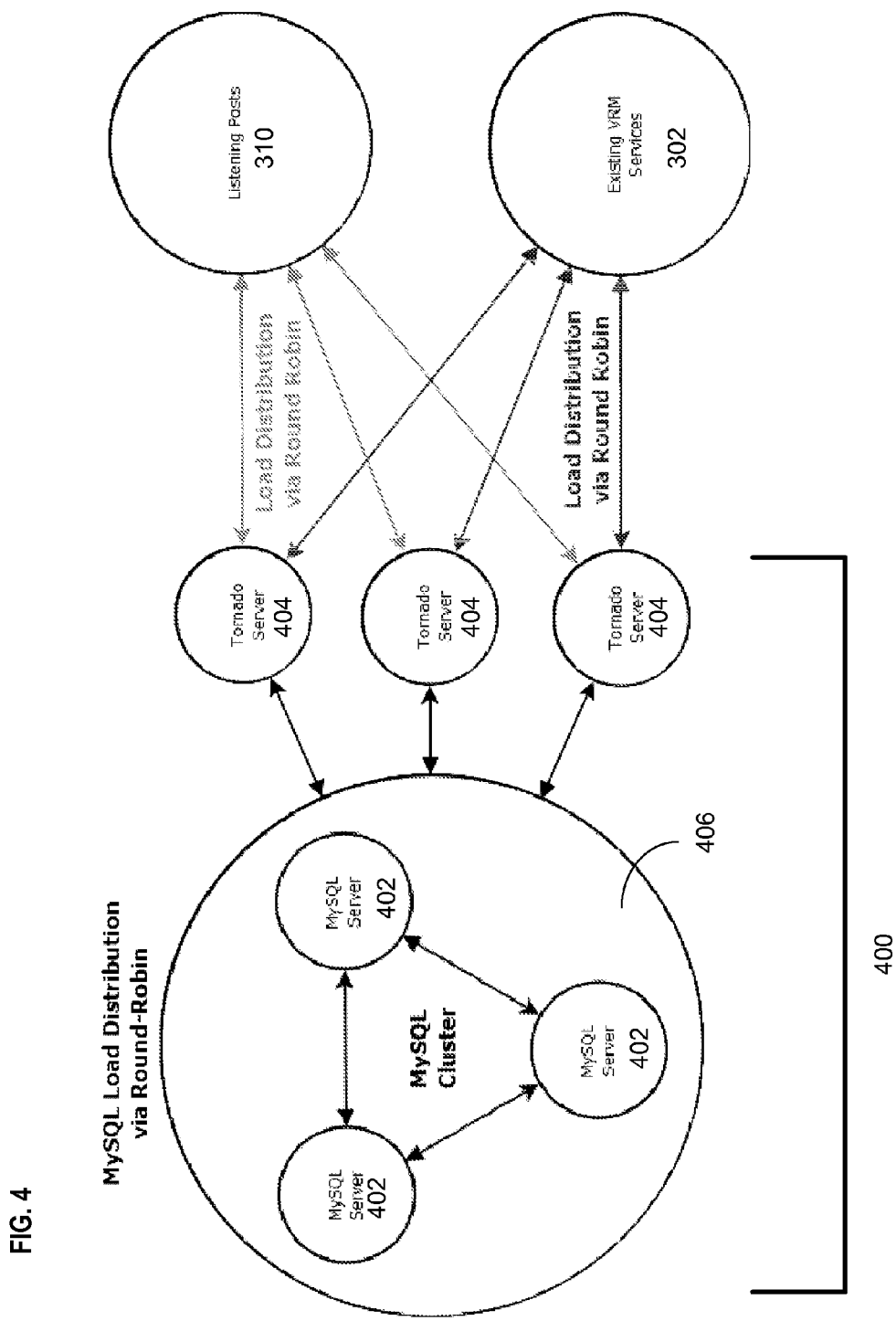
FIG. 4 is a schematic representation of an exemplary embodiment of a control post cluster that may form a part of the RVMA.

As shown in FIG. 4, in one exemplary embodiment, control post 306 shown in FIG. 3 may be implemented as a control post cluster 400 that includes one or more database servers 402 and one or more web servers 404. In one exemplary embodiment, this control post cluster 400 may be central to the operation of the RVMA and is designed for redundancy and load balancing purposes. Although the control post cluster 400 may be run on a plurality of physical devices, all of the services on the cluster could also be run on a single device, for example, a single Linux host computer.

Database servers 402 may themselves be clustered to form a database server cluster 406, which may be configured for redundant data storage of customer information. Customer information stored by database server cluster 406 may include system profiles of all implanted and discovered hosts on the target network; configuration information; black and white list profiles that are used for determining if a host is to be targeted for exploitation; project operating hours, meaning the operating hours for exploitation and scanning allowed by the client; and implant message queues, which contain any messages for implants, such as commands. These commands may be stored and retrieved when an implant beacons. Then, when the implant beacons again, the response is also stored in the database cluster. Beaconing is the process by which an implant, listening post, or other portion of the RVMA transmits or receives data at a predetermined interval. In one exemplary embodiment, the database server cluster 406 is implemented using MySQL, and open-source relational database management system based on Structured Query Language. In one exemplary embodiment, control post cluster 400 is not accessible from outside networks, such as the internet.

Figure 5:
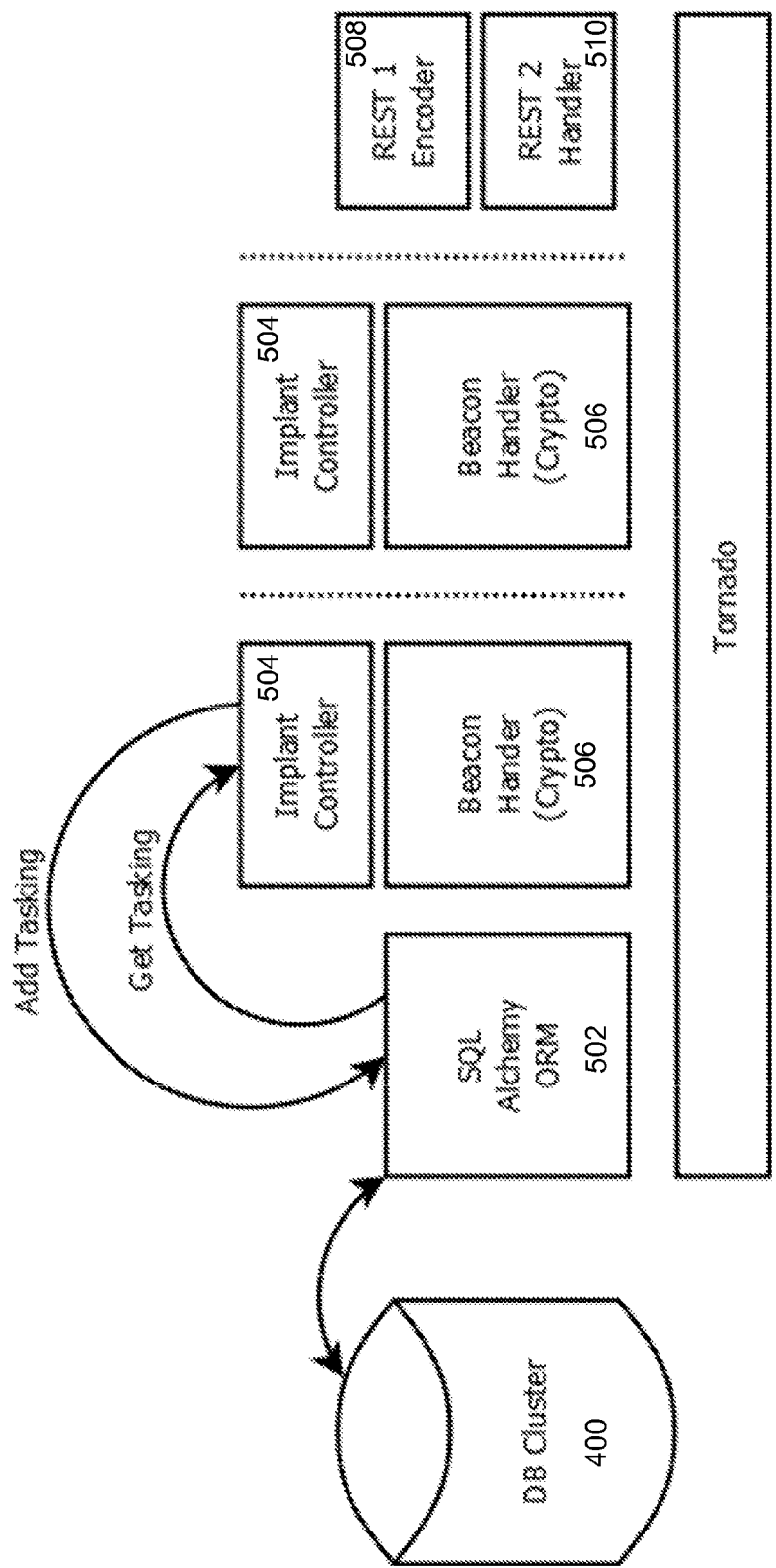
FIG. 5 shows additional details of an exemplary web server that may be used in an exemplary embodiment of the RVMA.

FIG. 5 shows additional details of an exemplary web server 404 used in the RVMA. In one exemplary embodiment, web server 404 is a multi-threaded event-driven framework that is fast and resource efficient. Such a framework is well suited for use in control post cluster 400 due to its performance and ease of use. As shown in FIG. 5, in one exemplary embodiment, web server 404 may be an open-source web server such as Tornado, which is a web server and web application framework written in the Python programming language.

Web servers 404 may be configured to support the implants 312 and 314 by providing services to the implants when requested. For example, web server 404 may send modules requested by the implants, and it may give commands to the implants to control their actions. Web server 404 may also determine what OVAL checks to send to the implant to run. Web server 404 may also determine which nodes should be scanned on the target network, and in particular, how the scans should be performed. Web server 404 may also determine which systems to target for exploitation and scanning, and choose which exploit to use, as well as determine the source, destination, port, and other pertinent information to be used when the exploit is implemented.

In one exemplary embodiment, as shown in FIG. 5, web server 404 has handlers for communicating with the listening posts 310 as well as restful communications with the VRM console server 302. For example, web server 404 may include an object relational mapper 502 such as SQlAlchemy ORM, configured to communicate with the database cluster 400 as well as with an implant controller 504. Web server 404 may also include a plurality of handlers for communicating with implants 312 and 314, including one or more beacon handlers 506. Web server 404 may also have encoders 508 and handlers 510 for communicating with the VRM console sever 302 using the RESTful API over HTTP.

In one exemplary embodiment, the process for handling listening post beaconing within is as follows: first, listening post 310 connects to beacon handler 506 via HTTPS/POST and uploads messages from the implants 312 and 314. These messages are then decrypted and handed to the implant controller 504. Each message is handled, and any tasking that is created is written to the database while keeping track of which implants 312, 314 the implant controller 504 has received messages from.

Implant controller 504 then queries the database, through object relational mapper 502, for any tasking, such as tasking added by other implant controllers due to beacon-related race conditions or load balancing. Implant controller 504 then packages the messages and sends the messages back to listening post 310 in its response, which is then forwarded to the edge implants 312 on their next beacon. In one exemplary embodiment, implants 312, 314 report all information to control post cluster 400, and all decisions are made at the control post cluster. Without orders, the implants may be configured to sit and do nothing but beacon occasionally.

Figure 6:
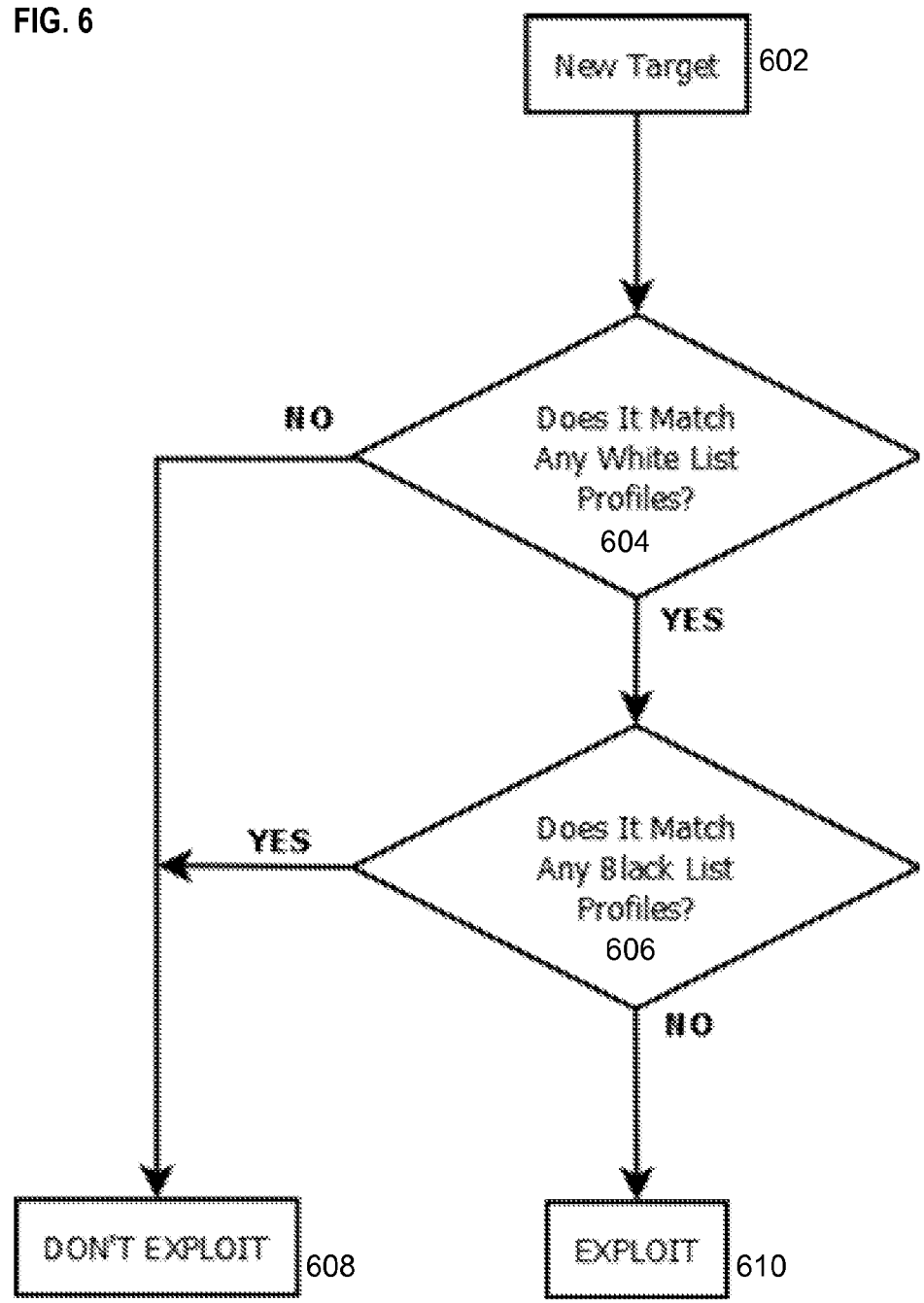
FIG. 6 is a flow chart showing an exemplary process that may be undertaken by the RVMA to determine whether a node should be exploited.

In one exemplary embodiment, the RVMA uses white list and black list profiles to determine which targets should and should not be exploited. Because the control post cluster 400 may not be on the target network, the RVMA may match the externally available information against rules that describe a target. A set of rules may be known as a profile. All rules in a profile must match for the profile to match. White list profiles allow targets to be exploited, and may be tested first. Black list profiles prevent a target from being exploited and may be tested last. FIG. 6 is a flow chart showing this process. At 602, information on a new target is acquired by the RVMA. At 604, the RVMA determines whether the information relating to the target matches any white list profiles. If there is a match to a white-list profile, the target is not exploited, as shown at 608. If there is a match to the white-list profile, the RVMA would then determine whether the information relating to the target matches any black-list profiles, as shown at 606. If there is no match to the black-list profiles, the exploit is implemented at the target, as shown at 610. If there is a match to the black-list profiles, the target is not exploited, as shown at 608.

All profiles, white or black, may contain the same information, for example, the IP Address/Subnet Mask or IP Address Range; TCP Port States (open or closed); and Reverse DNS Hostname Mask. The RVMA may also attempt to obtain information about the target operating system, or about specific information regarding running services and their versions instead of port numbers. On certain networks it may be desirable for exploitation and scanning to only be done in the off-hours of a user's network. The RVMA can thus be configured to operate only between a begin and end time designated by the user, between which a task is considered "released" so it can be sent to a target on the next beacon.

Figure 7:
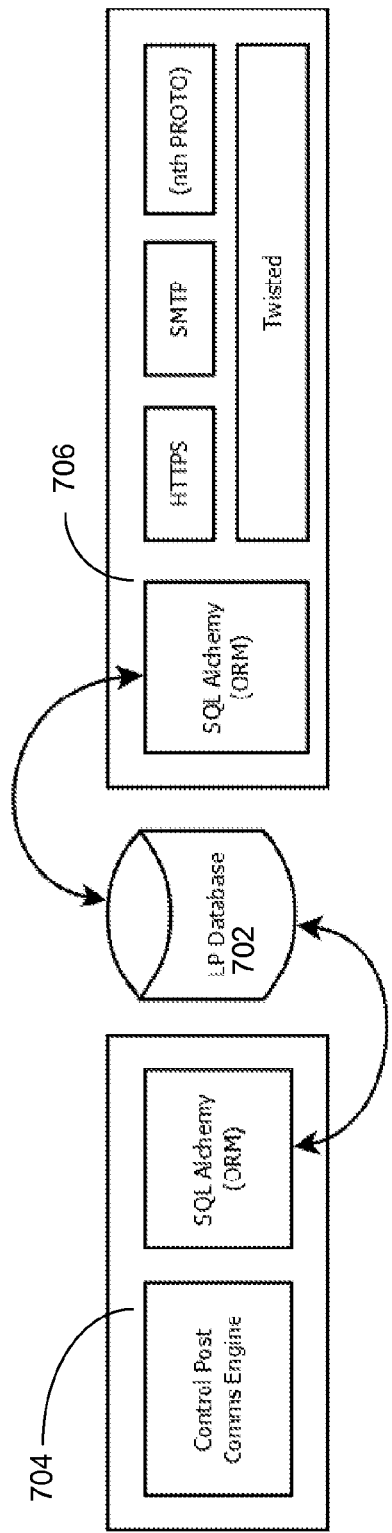
FIG. 7 shows an exemplary embodiment of the architecture of a listening post that may form a part of the RVMA.

FIG. 7 shows an exemplary embodiment of the architecture of listening post 310. In the exemplary embodiment shown, listening post 310 may be made up of two separate processes, sharing a common listening post database 702. The two main components are a control post communication engine 704, which may be configured to communicate with control post cluster 400, and an implant communication engine 706 configured to communicate with edge implants 312.

Control post communications engine 704 may be configure to send messages at predetermined intervals between control-post cluster 400 and edge implants 312. The messages may be stored in listening-post database 702. Control post communications engine may be configured to retrieve, store, and send messages from the implants to control post cluster 400 for handling, as well as messages from control post cluster 400 to the implants. In one exemplary embodiment, this framework is a Python application based on a service-oriented architecture.

Implant communications engine 706 may be configured to handle beacons from the implants, store the messages from the implants to the control post cluster 400 in the database, and send the messages (stored in the database) from the control post 400 to the implants 312. As shown in FIG. 7, in one embodiment, each protocol present in the implant communications engine 706 (HTTPS, SMTP, or any other suitable protocol) may have its own module, all of which may be configured to run on top of a programming framework such as Twisted, an event-driven network programming framework written in Python. Both the control post communications engine 704 and the implant communications engine may be configured to use utilize an object relational mapper, such as SQL Alchemy, to access listening post database 702.

As shown in FIG. 3, implants 312, 314 are the portion of the RVMA that sits on the target network 308. In other words, implants 312, 314 are local instances of the RVMA bot. As shown in FIG. 3, edge implants 312 may be connected to the internet and communicate with listening posts 310 through IMP (Implant Message Protocol) or any other suitable protocol. Depth implants 314 are embedded within the target network 308 and do not have access to the internet. Instead, depth implants 314 may be configured to communicate with edge implants 312.

In one exemplary embodiment, implants 312, 314 are designed so that they exist only in memory of the host node device. In such an embodiment, any files required for use by the implant will remain in memory. This makes removal much easier, and detection of the implant much harder. Implants 312, 314 may be written in any suitable level programming language. In one embodiment, the implants are written in a platform-independent language such as Python 3. In some embodiments, the stager and loader may require architecture dependent versions (i.e. x86 and x64).

In one exemplary embodiment, implants 312, 314 are designed to be modular, meaning that without any modules, the only thing the implant can do is load modules. This modular design provides software protection, since not all portions of the software will be on target at the same time, making it difficult for an outside party to get a full view of the implant. Modular design also increases performance by saving memory, computer processor cycles, and network bandwidth. For example, modules may be downloaded from control post cluster 306 only and loaded from memory only as needed. Further advantages of the modular design include supportability. Because almost everything is a module, the RVMA is able to unload old and load new modules without stopping actions on a given target.

Implants may also be configured to communicate with other implants that are on the same network, that is. They support Peer-to-Peer (P2P) communication. This P2P support saves bandwidth because implants can download modules from other implants, saving bandwidth at the exit nodes of the target network, as well as on a security service provider's servers. P2P support also allows for redirection or pivoting, meaning that implants have the ability to beacon through other implants, so not every implant has to have access to the internet. In other words, depth implants 314 can beacon through edge implants 312 to communicate with listening post 310.

Figure 8:
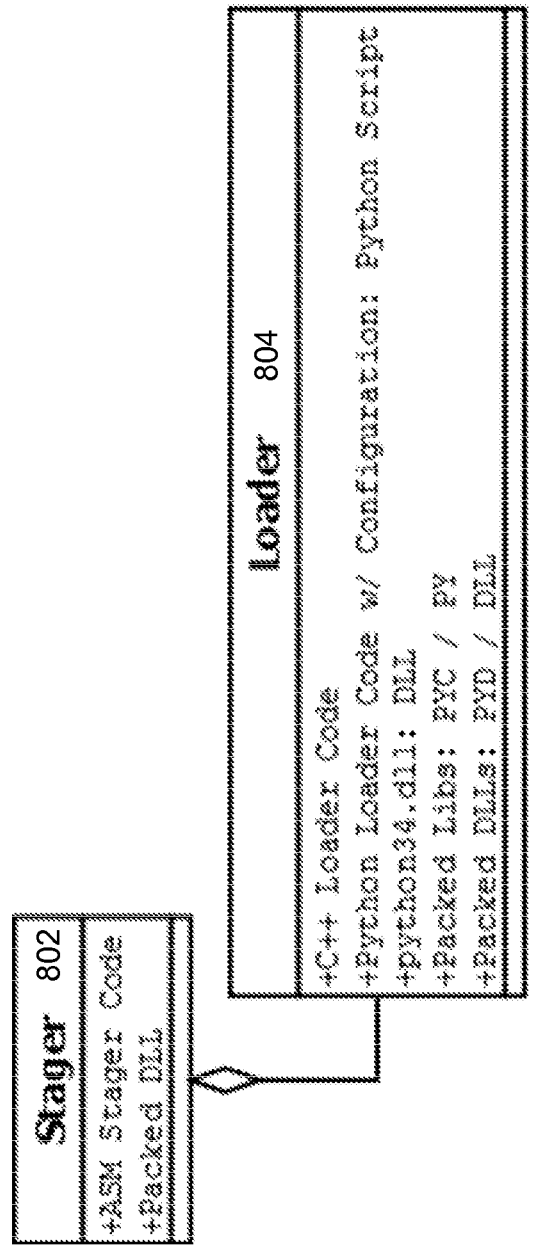
FIG. 8 illustrates an exemplary embodiment of a stager for setting up a native environment on a target node in one embodiment of the RVMA.

Nodes on target network 308 are not expected to have the designated programming language need by the RVMA bot (Python, for example) installed on the node. As a result, as shown in FIG. 8, a Stager 802 is configured to setup the native environment on the target node. Stager 802 may take a DLL (Dynamically Linked Library), unpack it into memory on the target node, and call an ordinal on it. A loader 804 may be configured to then setup an environment in memory for the designated programming language (Python in the example shown in FIG. 8), and run a specified script. Loader 804 may be compiled and linked as an executable file or a DLL, while maintaining the same functionality. Loader 804 may also be responsible for storing the implant initial configuration.

An exemplary embodiment of this process of setting up the native environment on the target node is shown in the Table 1 and Table 2 below, in this case using a C++ loader and Python Loader Code:

TABLE 1

| C++ Loader |
| --- |
| Main method is called (by the Stager; or if the loader is an EXE, by Windows). Loads the Python 3.4 engine (via in-memory loading python34.dll). Uses Py_Initialize to initialize the Python interpreter. Adds all PYD/DLL files via PyImport_AppendInittab. Compile and run the Python Loader Code via PyRun_String. |

TABLE 2

| Python Loader Code |
| --- |
| Adds a meta_path module finder object to generate module loaders as needed when a new module is attempted to be imported. Loads and calls the main script to start off implant operation. |

In one exemplary embodiment, the embedded configuration includes the following: included module list, communications/beacon information, listening post list (for edge implants), and P2P neighbor list (for depth implants). At a minimum, each implant should include ability to beacon, so that it has the ability to download new modules. In some embodiments, each implant may also include a recon module for gathering data about the system.

When an implant requires a new module, the RVMA can be configured to fulfill the request through an import mechanism in the designated programming language. Once requested, if a module is not available locally (i.e. from memory), the implant may attempt to acquire the module via P2P from neighboring modules. If the module is not available from a peer, it may be requested from the control post at the next beacon.

In one exemplary embodiment, the first implant to be setup in a network should have access to the internet, so it can beacon. As described above, these implants with internet access are called edge implants, as shown in FIG. 3 at 312. Edge implant beaconing protocols may be used to carry JSON (JavaScript Object Notation) messages identifying the implant, and possibly carrying exfiltrated information. These messages may be relayed to the control post 306 when the listening post 310 next beacons. The message to the control post 306 may be encrypted with the public key of the control post 306, and signed by the implant. After receiving a message, the control post 306 may then respond with messages encrypted with the implant's public key, and signed by the control post 306. These messages will then be retrieved by the listening post 310 on the implant's next beacon to the listening post 310.

Beaconing may be performed by beaconing modules in edge implants. The purpose of the beacon event is to check for tasking and perform message passing. The first beaconing module may be a DNS to check for tasking with HTTP(S) message passing. Beaconing may be performed at specific intervals to reduce the network profile of the implants within the target network.

As described above and shown in FIG. 3, the implants deeper into the network are called depth implants, shown at 314. Depth implants 314 may use a P2P network protocol, such as CIFS (Common Internet File System), to transmit messages between depth implants, and eventually to an edge implant, listening post, and control post. Messages from the control post to the depth implants take the same path as messages for the edge implants, except they travel through the P2P network from the edge implants to the target implant. In one embodiment, both edge implants and depth implants communicate using the Implant Message Protocol (IMP), which will be described in greater detail below.

To facilitate communications between depth and edge implants, the RVMA may include Peer-to-Peer (Implant-to-Implant) communication modules. For example, an implant-to-implant communication module may be a plain UDP (User Datagram Protocol) module, passing messages over UDP between peers. In another embodiment, implant-to-implant modules may be configured to disguise the message traffic as other types of peer-to-peer traffic such as SNMP (Simple Network Management Protocol). Unlike beaconing protocols, implant-to-implant protocols are not set on an interval. Whenever a message is received, is it passed on as quickly as possible, which reduces delay for communications with implants that are many hops deep in the target network.

Some beacon protocols may not be well suited for large file/message transfer (i.e. DNS). As a result, another protocol such as HTTPS may be used from the edge implanted to the listening posts.

In one exemplary embodiment, updating modules in an implant may be accomplished by acquiring the module, unloading the existing module, and loading a new module in its place. In one embodiment, updating the base of the implant (the module loader itself), requires starting a new instance of the implant and transferring working data to the new implant so that the old implant can exit.

It is entirely possible that an implant will get stranded. For example, a user could be on a laptop that loses connection to the network. In one exemplary embodiment, when the implant beacon fails several times, it automatically removes itself. In the case where the implanted system is quickly connected to a new network, one that falls outside the scope of the spreading boundary defined by the user, the implant can be configured to detect this (for example, by checking the network information before each beacon) and in this event, remove itself. In one exemplary embodiment, the control post does not need to be alerted if an implant is stranded. Once an implant misses a beacon by a predetermined amount of time, the implant may be considered as gone, and may be marked inactive in the control post database.

Tasks for implants may be kept in the control post database. When an implant beacons it may retrieve a list of tasks to perform. In the event that all implant actions should be stopped, a task for the implant to remove itself may be appended to this list. At the implant's next successful beacon, it will receive the task to remove itself.

Another confidentiality concern is the memory dumping of the implant by a malicious user with the intent of reverse engineering. By using a modular design, the RVMA may address this concern by reducing the amount that a single user is able to obtain via a memory dump, since the user can only obtain what is currently being used.

After an implanted system exploits another system, a copy of the base implant may be sent to that system over the network, unencrypted. This presents the opportunity for a malicious user to use network sniffing to capture a copy of the base implant. To address this concern, the RVMA may include encrypted stages in the implant deployment. Also, the RVMA may be configured to monitor the strain that implants are putting on the target network or processor utilization on the target network. If the RVMA determines that the strain is above a predetermined threshold, the RVMA may include timed waits in module code to slow down operations. Alternatively, the RVMA may increase the beacon interval to reduce the strain on the target network.

In one embodiment of the RVMA, all sensitive implant communications, known as payloads, may be compressed using a compression algorithm (DEFLATE, for example) and encrypted, for example using a 256-bit Advanced Encryption Standard (AES-256) key. In one exemplary embodiment, keys may be exchanged via RSA authenticated Diffie-Hellman with a prime from RFC-3526. Messages may also include a message Globally Unique Identifier (GUID) as well. Together this provides the following:

Replay Protection—The list of message GUIDs will be kept by each side. When a new message arrives, its GUID is checked against that list. If there is a match, the message is discarded.

Integrity—Each message is signed by the sender's RSA key. This helps ensure that a message really came from its specified sender, and has not been modified.

Confidentiality—Encrypting the data with AES-256 prevents malicious users from viewing the decrypted traffic. This not only protects customer data, but also protects implant modules in transit to the target nodes on the target network.

Key Breach Protection—In the event that the private RSA key of the control post or an implant is breached, using RSA for authenticated Diffie-Hellman Key Exchange prevents past communications decryption (any past traffic that was captured cannot be decrypted with the RSA private key) and future communications decryption (any future traffic cannot be decrypted without the attacker also performing non-trivial packet manipulation during a high-profile MITM (Man-in-the-Middle) attack. In the event of an RSA key breach, the RVMA may generate new RSA keys for all systems breached.

Authentication—With the use of RSA, the RVMA can ensure that each side is who they say they are.

Performance—Speed and low memory usage result from the use of efficient compression algorithms and encryption, such as AES and DEFLATE, and network usage may be reduced as a result of the compression.

In one exemplary embodiment, cryptographic functionality for all components is a shared library based around a cryptography toolkit, such as PyCrypto. This library may be used to create and sign certificates for implants.

Figure 9:
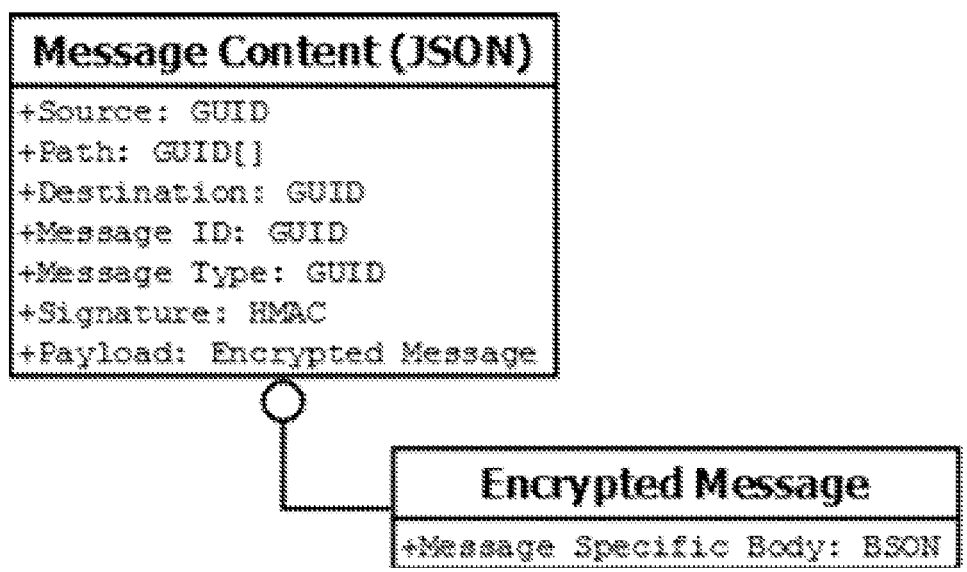
FIG. 9 shows an exemplary embodiment of message sent between implants in an exemplary embodiment of the RVMA.

In one exemplary embodiment, once key exchange is complete, all messages will be an uncompressed BSON blob (for routing and parsing performance), and contain the following fields, as shown in FIG. 9:

Source—The GUID of the source node.

Path—A list of node GUIDs that this message passed through. This may be used by the control post cluster for load balancing.

Destination—The GUID of the destination node.

Message ID—The GUID of the message.

Message Type—The type of message that the payload is. This helps identify the type of handler module on the receiving end that should handle this message.

Signature—The HMAC (keyed-hash message authentication code) of all fields in the message.

Payload—The compressed and encrypted module-specific payload. This is generally a second BSON blob.

Figure 10:
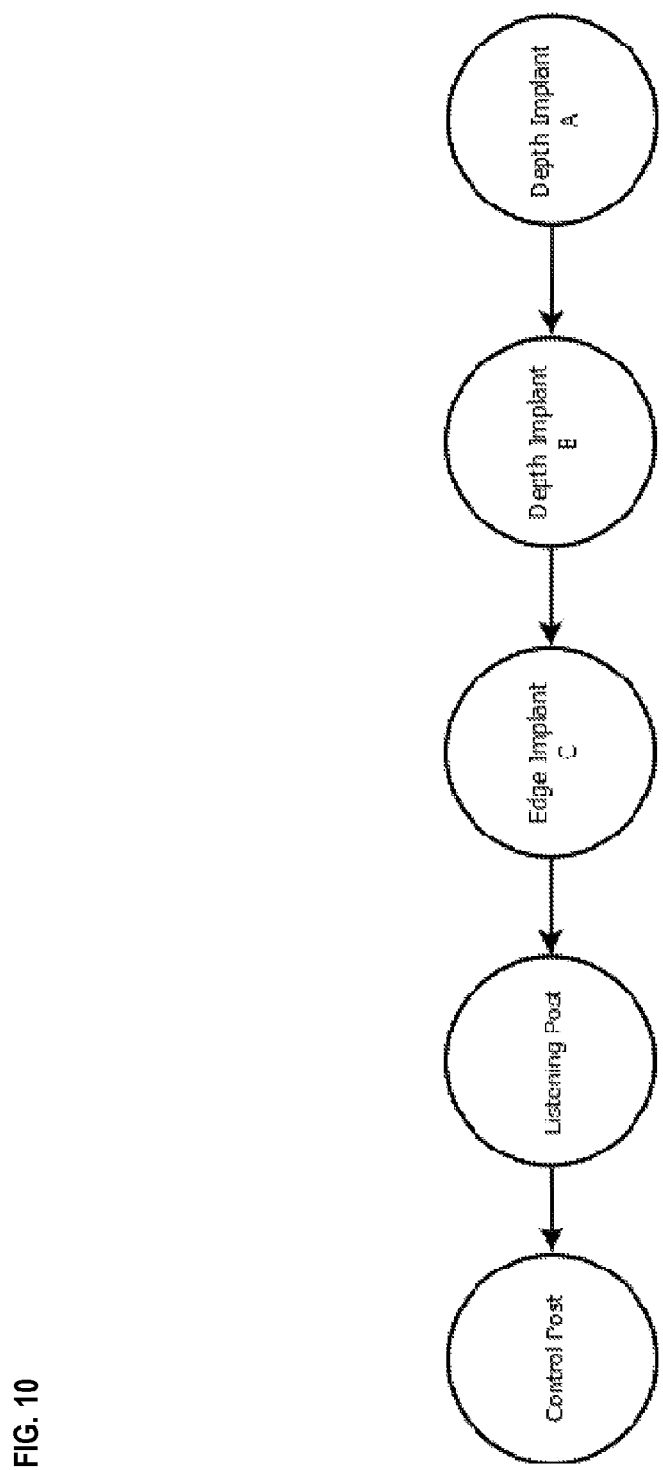
FIG. 10 is an illustration of the "store and forward" technique that may be used by edge implants and listening posts in an embodiment of the RVMA.

In one exemplary embodiment, the messages to and from the control post from and to the implant will may be transmitted from/to the using a technique called "store and forward." A message received by a listening post or an edge implant (when the message is going to a listening post), may be stored until the next transmission event for the receiving node occurs. Accumulating messages at the listening post or edge implant in this manner prevents constant network traffic, thus reducing overhead. An example of this "store and forward" technique is shown in FIG. 10. As shown in the figure, depth implant A two hops deep. If depth implant A needs to get a message to the control post, it must go through two other implants via P2P traffic before it can reach the listening post, and then the control post.

As shown in FIG. 10, depth implant A sends the message to depth implant B, which forwards the message immediately to depth implant C, since P2P traffic does not use the "store and forward" technique to avoid possible latency issues in implants that are several hops deep. Edge implant C stores the message, along with any others that it has received from any other implants, until it is time for edge implant C to beacon. When the beaconing interval for edge implant C is up, edge implant C sends the message, and any others that it is storing, to the listening post, which then stores the messages until it is time for it to beacon.

When the beaconing interval for listening post is up, the listening post sends the message to the control post, and the message is now at its destination. Any messages going back to the implant follow the last-received-from path, in other words, the same path, but in the opposite direction. Each implant may be configured to keep track of which nodes it has sent traffic to and from which nodes it has received traffic.

Figure 11:
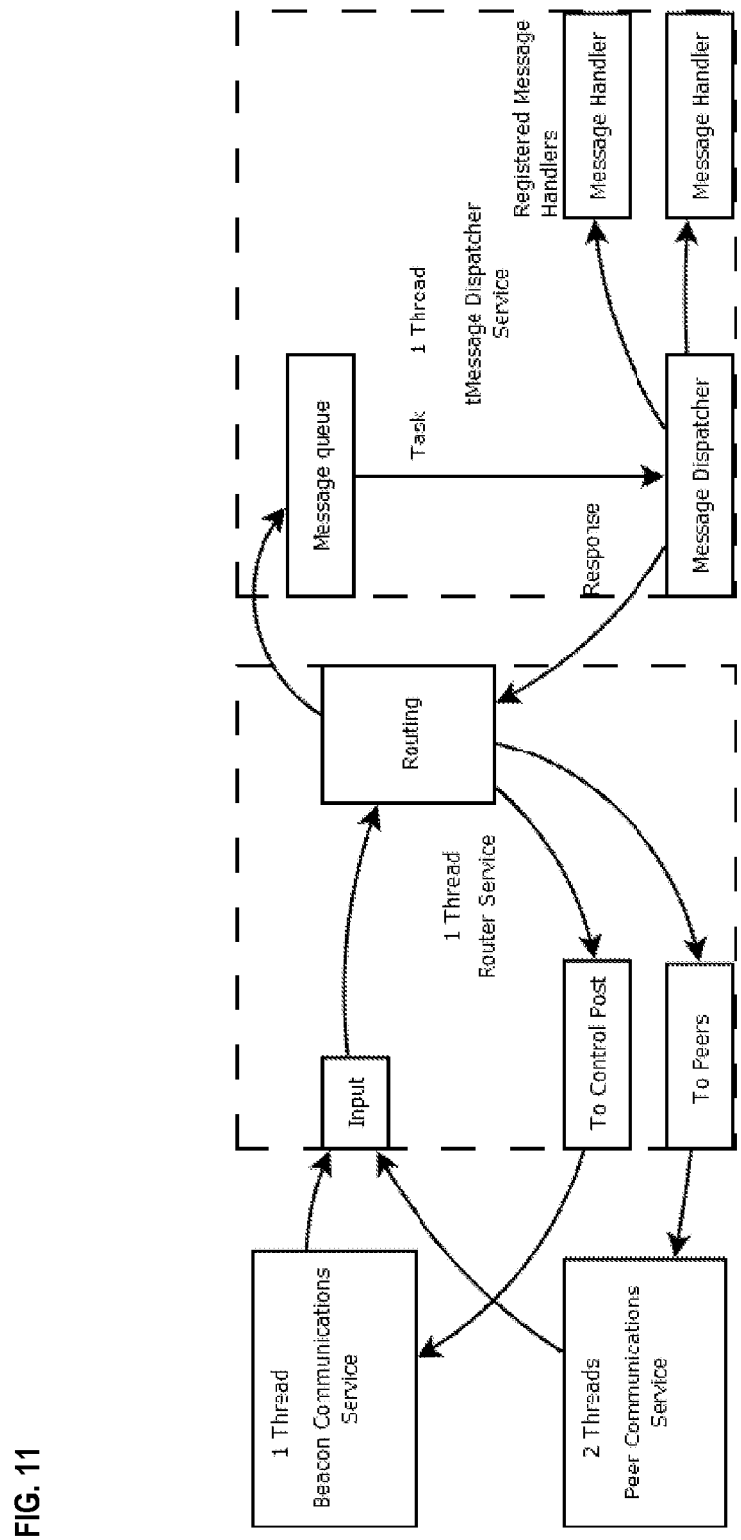
FIG. 11 is a data flow diagram showing the router service and interactions with a message dispatcher and communications services within the implants of an exemplary embodiment of the RVMA.

FIG. 11 is a data flow diagram showing the router service and interactions with message dispatcher and communications services within the implants. The beacon communication services shown may only be present (module loaded, configured, and listening) on edge implants. In one exemplary embodiment, messages received via beacon and peer communications services are handled uniformly through a single input queue and per communication or message dispatch service output queues. In addition, threads may be implemented in such way that processor usage spikes are prevented.

Figure 12:
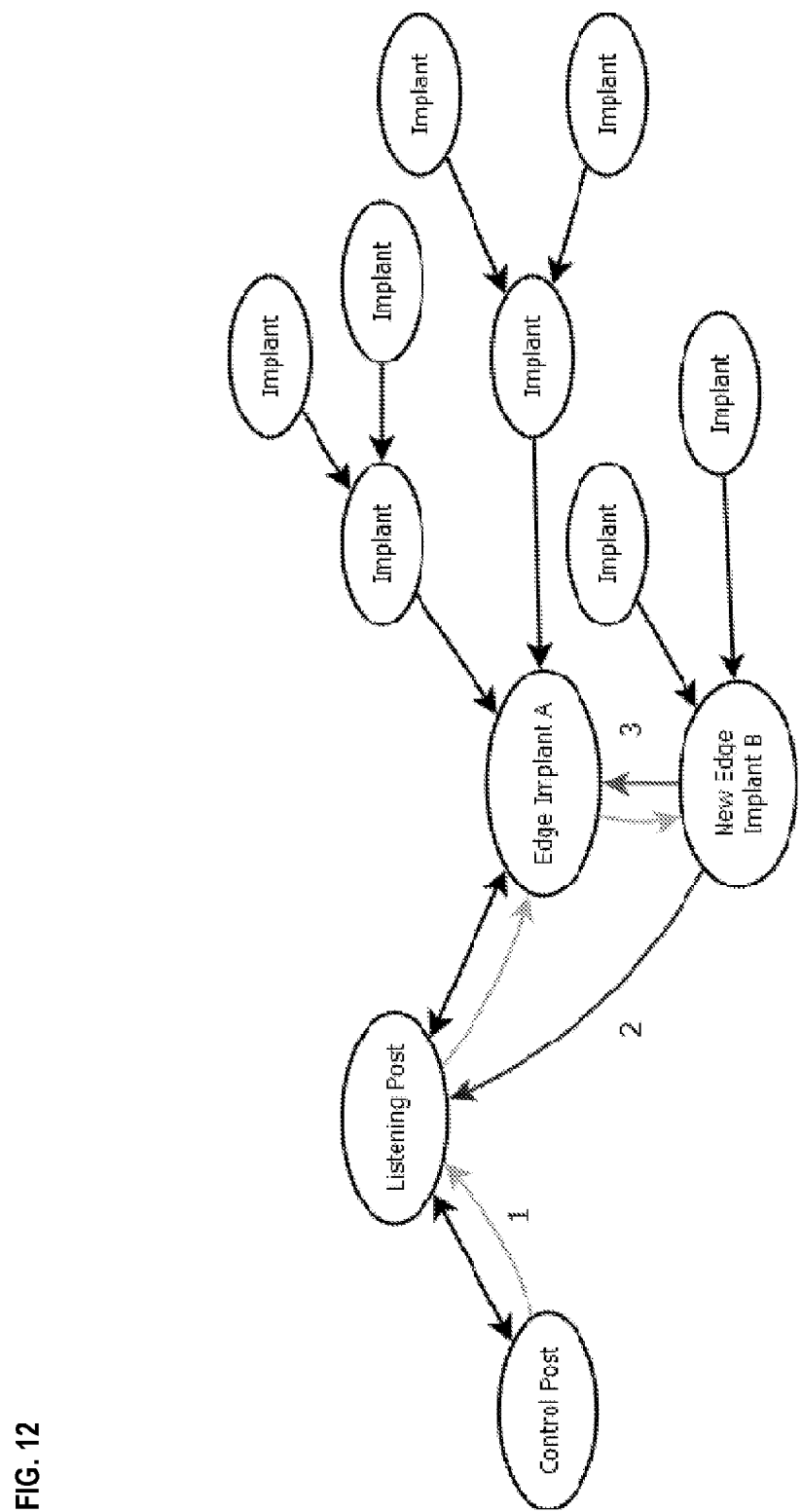
FIG. 12 illustrates a method of load balancing implant communications in an exemplary embodiment of the RVMA.

FIG. 12 illustrates a method of load balancing implant communications. The primary goal of this operation is to spread the burden of communicating depth implants by allowing the implant to selectively route peers to downstream implants or listening posts. An exemplary procedure for load balancing implant communications in the RVMA is as follows: within the control post, an implant with a high number of upstream peers is identified. Next, an immediate upstream peer of the implant is tasked with adding a route. (1) implant B is tasked with rerouting to implant A's default route. If this route would promote this implant to an edge implant, beacon communication services would be requested, loaded, and attempt to beacon on implant B. (2) Following successful communications to the new route, the implant would set this route as its default. (3) The rerouted implant responds to the peer that dispatched the message indicating success.

This type of load balancing may be implemented so that it can be performed anywhere in the peer network. In one exemplary embodiment, at least some of the logic for this action is left out of the implant and issued as several successive commands from the control post, which allows load-balancing to be performed based on decisions on rule sets, network restrictions, or other criteria. The control post may watch for implants with a high peer count (immediate and upstream) and perform load balancing accordingly. The logic may prefer width count over depth to shorten routes, which will lower delays between control post tasks and the arrival of these tasks at the appropriate implant as well as response messages. This also serves to lower the overall bandwidth usage by transmitting the same message fewer times.

Figure 13:
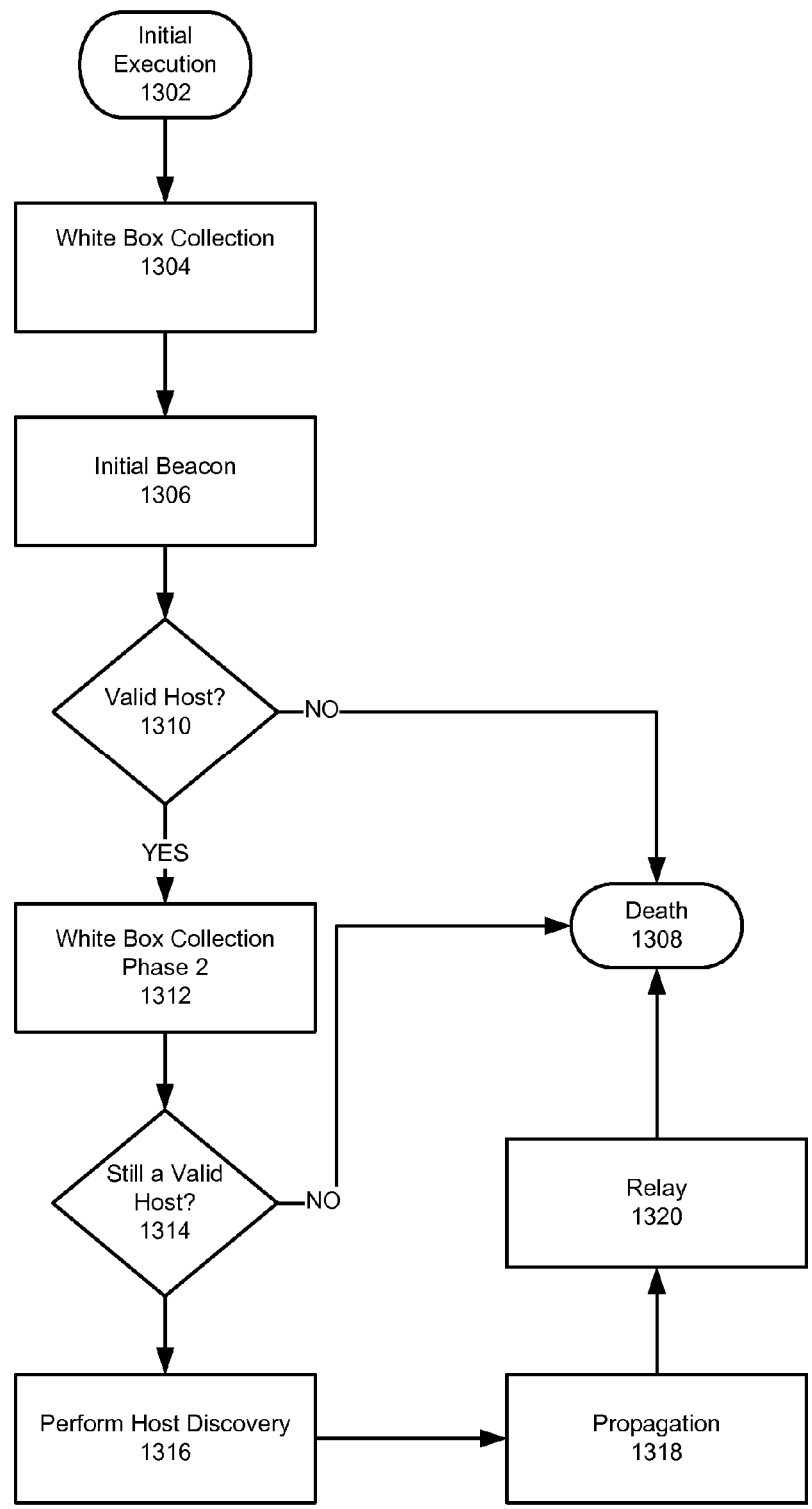
FIG. 13 is a flow diagram illustrating an exemplary embodiment of the RVMA bot lifecycle for module loading in the RVMA.

FIG. 13 is a flow diagram illustrating an exemplary embodiment of the implant or RVMA bot lifecycle for module loading in the RVMA. The RVMA bot lifecycle refers to the process through which the RVMA bot spreads through the target network, gathering and feeding data back to the control post cluster for analysis and storage. The phases of this lifecycle, as shown in FIG. 13, are described below.

As shown in FIG. 13, at 1302, the RVMA bot is initialized, meaning that the RVMA bot is run on a new target and goes through the initialization process, which may include unpacking data structures, initializing the programming language environment, and the like. At 1304, the RVMA bot enters phase 1 of the white box collection, which may include gathering a minimum set of data about a target (IP/MAC, hostname, OS, and the like). This is needed for the first beacon to know which tasking should be performed. At 1306, the initial beaconing occurs, meaning data is sent back to the control post, informing it of the newly acquired target, as well as requesting tasking. In one exemplary embodiment, each stage from here on is tasked specifically by the control post, which requires a second beacon to return the results. Tasks may also be queued more than one at a time via IMP (Implant Messaging Protocol).

At 1310, the RVMA determines whether the newly acquired target host is a valid host. If the host is not valid, the process dies at 1308. If the host is valid, that is, if the host is on the target network and within the parameters set by the user, the RVMA bot enters phase two of the white box collection at 1312, where the RVMA bot determines operating system specific data (i.e. OS patches/Service Packs, drive/file listings, domain controller IP/hostname, and the like). At 1314, the RVMA once again determines whether the target host is a valid host, and may also perform a local vulnerability scan on the infected system.

If the host is not valid, the process dies at 1308. If the host is valid, the process moves on to host discovery at 1316, which may include initial host discovery using operating-system specific parameters (SMB/CIFS sweeps), as well as generic (different types of pings, ARP table dumps, DNS dumps, and the like) techniques to discover hosts on the connected network segments. During this step the RVMA bot will attempt to gather as much information about these targets as possible without performing more intense techniques such as port scanning. This could include reverse DNS lookups or other suitable techniques.

During host discovery at 1316, the RVMA may also perform host vetting. Once initial host discovery is complete, the results are returned to the control post, analysis is performed, targets are chosen, and a list of tasks is returned. The targets may be chosen based on preconfigured black and white list profiles. The list of tasks that is returned will have the RVMA bot focus on those targets to determine what propagation mechanisms might work on them (if any). When this data is returned, it is again compared to black/white lists for ports/services. Next, a port scan may be conducted, using any suitable method (syn sweep, xmas tree scan, TCP full connect, and the like). Banner grabbing may also be performed in an attempt to read data from ports the RVMA is connected to. This data may then be returned to the control post cluster for analysis to determine which services are running on the target node. SMB scanning may also be performed to gather information about the target system.

At 1318, propagation occurs. During this stage, the RVMA bot may use propagation modules to propagate to other targets designated in the steps above, including target selection and target probing. In one exemplary embodiment, propagation modules have two sub-stages, either of which can fail, and the propagation method is aborted. The bot will beacon back to inform of success or failure, so other propagation mechanisms may be attempted if needed. The first module is vector vetting at, where the RVMA performs any further, technique specific vetting of the target (connect and check protocol versions, attempt credentials, and the like). The second module is a propagation attempt, where the RVMA attempts to perform a propagation technique, upload the payload to the target node, execute the payload if necessary, and report back success or failure.

At 1320, all data has been gathered, and the target is complete. However, the RVMA may continue to use the target node as a message relay as required for communication with RVMA bots further in the target network. At this point, the RVMA may also use this instance to propagate to other targets.

After the relay portion 1320 of the lifecycle, the RVMA bot dies, that is, the RVMA bot is either killed (machine powered off, process killed, etc.) or the RVMA bot will be told to exit gracefully by the control post cluster.

Figure 14:
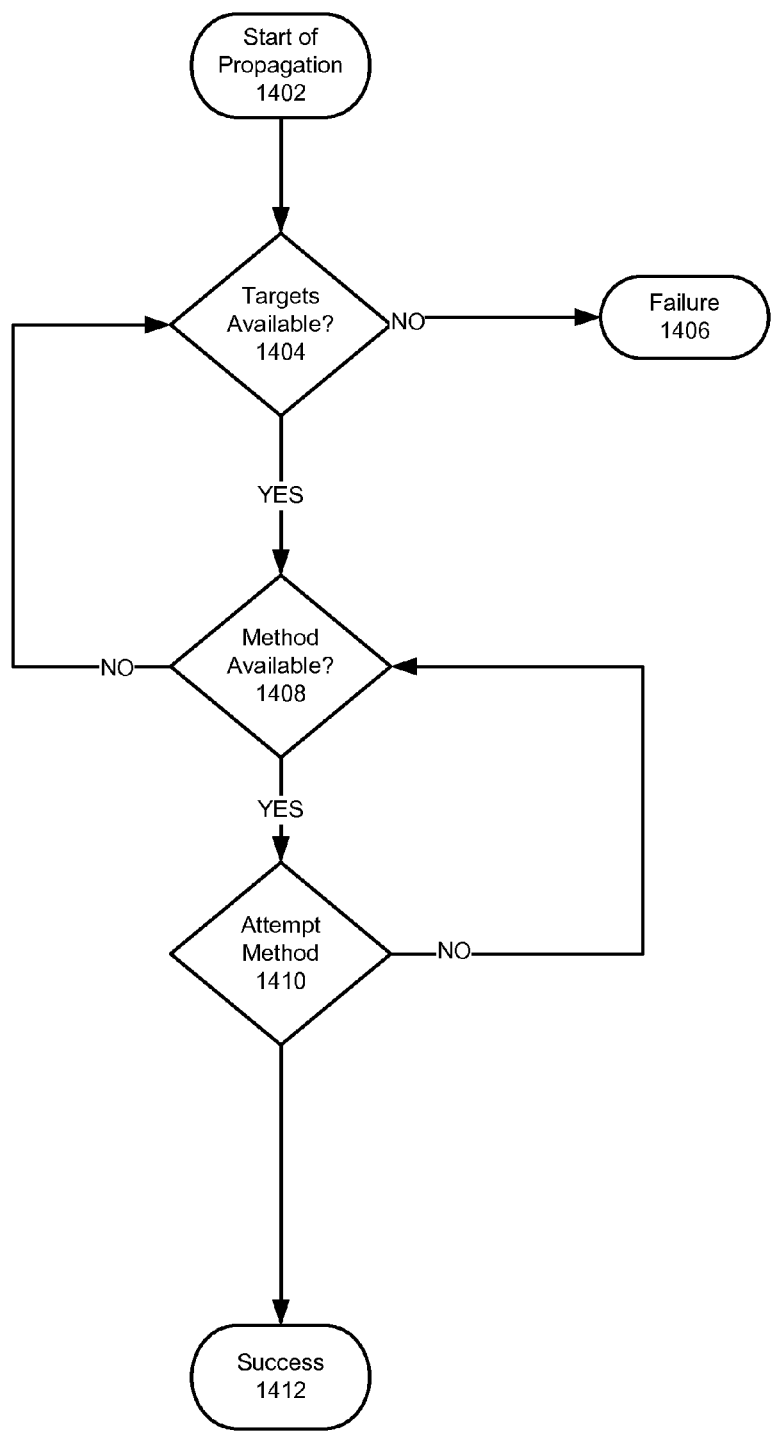
FIG. 14 is a flow chart illustrating an exemplary automated propagation process of the RVMA bot.

FIG. 14 is a flow chart illustrating the automated propagation process of the RVMA bot as it travels through a target network. At 1402, propagation begins. At 1404, the RVMA determines whether targets are available. If a target is not available, the process terminates in failure at 1406. If a target is available, the process move on to 1408 to determine whether an appropriate method is available. If a method is available, the process moves on to 1410, where the available method is attempted. If no method is available at 1408, the process reverts to 1404 to determine if any other targets are available. If the attempted method fails at 1410, the process returns to 1408 to determine if other methods are available. If the attempted method is successful, the RVMA bot will have been successful in propagating into the chosen target, as shown at 1412.

As illustrated in FIG. 14, the automated propagation process include three main steps: target selection, propagation method selection, and propagation attempts. These steps are built into the implant lifecycle, with checks between each. Each of these steps is broken down below.

In one exemplary embodiment, target select may be broken into two primary steps: host discovery and host vetting. Host discovery determines whether new hosts exist. The RVMA may use any suitable method to determine whether new hosts exist, including ping sweeps, ARP cache dumps, DNS cache dumps, domain information, SMB sniffing, and the like. During host vetting, the RVMA checks to see if the host fits either a black list profile or a white list profile, to ensure that the target host is within the scope defined by the user.

Once the RVMA knows what targets it is going to attempt to propagate to, it may then need to work on narrowing down which propagation methods to use. In one exemplary embodiment, the RVMA has a priority list, which ranks the propagation methods by risk. In one exemplary embodiment, these are numeric values that may be assigned to each method by a user, based on experience and knowledge of the method. A risk rating of 1 indicates that the method shows no risk of causing system instability, a risk rating of to means that there is almost a certainty of system instability if this method is used. The specific risk threshold to be used for a target is determined by which white list profile it falls under. This may be chosen based on customer specifications for the engagement. If a propagation attempt fails, the next "riskiest" method may be chosen. If no more methods exist that would work for a specific target or are too "risky," the propagation is considered a failure.

When a propagation attempt is be run by the RVMA, it may perform specific steps to check if the propagation method would actually work (i.e. remote version checks and the like). If it appears that the propagation method will fail, the attempt may be aborted. If, on the other hand, the RVMA determines that everything should go smoothly, the propagation attempt may continue.

Table 3 and Table 4 below show exemplary embodiments of vetting and propagation methods that may be conducted post initial host discovery on white box targets. Each of these attempted techniques involve a more tailored process from acquisition and vetting that may take place earlier in the RVMA bot life cycle. Furthermore, tasking that is given to RVMA bots may be focused on a propagation methodology that is most likely to run successfully on a given target.

TABLE 3

Target Vetting

Port Scanning
    Using python-libnmap (or equivalent) as python may be initialized in memory. Libnmap has capabties to automate and schedule scans, manipulate scan results for reporting, and compare like-scans to generate useful data.
    Scans may be done using a variety of methods to ensure reliability and maximize useful data (TCP SYN, Full connect, Xmas, Null).
Banner Grabbing
    Per results of the port scanning, banner grabbing may be dynamic to need. Attempts may be made to gather data from connectable ports, and results may be reported back to the control post duster for analysis.
    Direct techniques within python may be utilized to gather this data.
    Nudge files may be crafted and used to enumerate specific protocols.
Target Templating
    Similarity of targets for categorization.
OS Fingerprinting
    Passive detection of operating system via nmap scanning,
SMB Enumeration
Reverse DNS Look-up
NetBIOS Enumeration

TABLE 4

Propagation

LM/NTLM authentication vulnerabties
    Pass the hash, pass the ticket, golden ticket, etc.
MS08-067
Null Session on Domain Controller
NTLM Replay
PyKEK & Mimikatz
    Generate Kerberos ticket with escalated privilege level using PyKEK.
    Use Mimikatz-like functionality to dump hashes, apply tickets, and propagate.
Common Methodology for easily exploitable systems
    Port scanning 139, 445, 1099, 8080, 8443
    Determine if SMB signing is enabled, unauthenticated access available, etc.
    Default/standard passwords.
Other custom modifies To house the modules as well as any other files on target, the RVMA may employ an in-memory file system that is backed by the control post cluster. In one exemplary embodiment, this may take the form of a file-system like service on the implant (or possibly the listening post for load distribution) that will present an interface to lookup files to load. The files may be looked up by path and name, similar to any Unix- or Linux-style file system. If a file is not present on target, the file system object may request the file from the control post (or listening post) and possibly from peers, to reduce gateway traffic.

Figure 15:
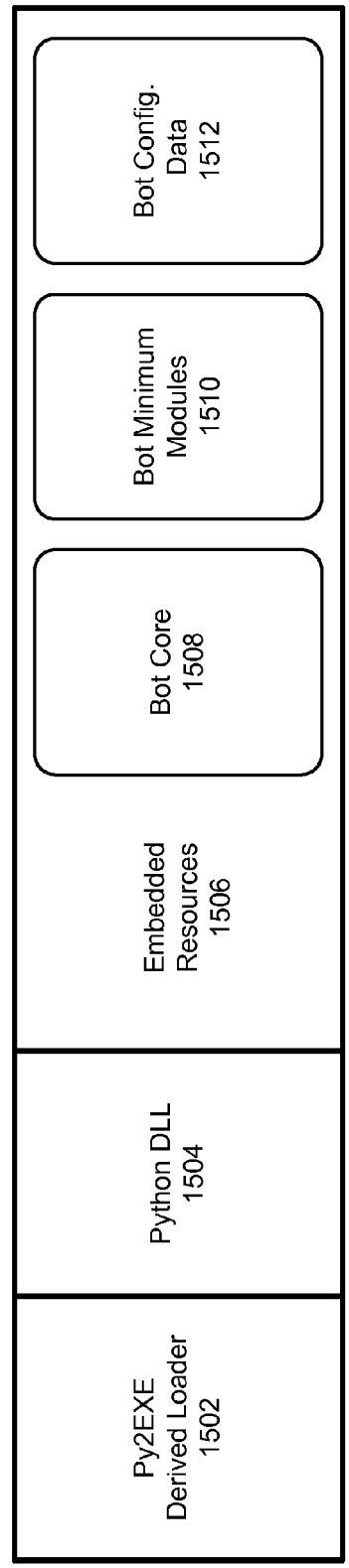
FIG. 15 illustrates an exemplary embodiment of a deployment design for the RVMA.

FIG. 15 illustrates an exemplary embodiment of a deployment design for the RVMA, including a derived loader 1502, a Dynamically Linked Library 1504, embedded resources 1506, an RVMA bot core 1508, RVMA bot modules 1510, and RVMA bot configuration data 1512.

RVMA Controller

Figure 16:
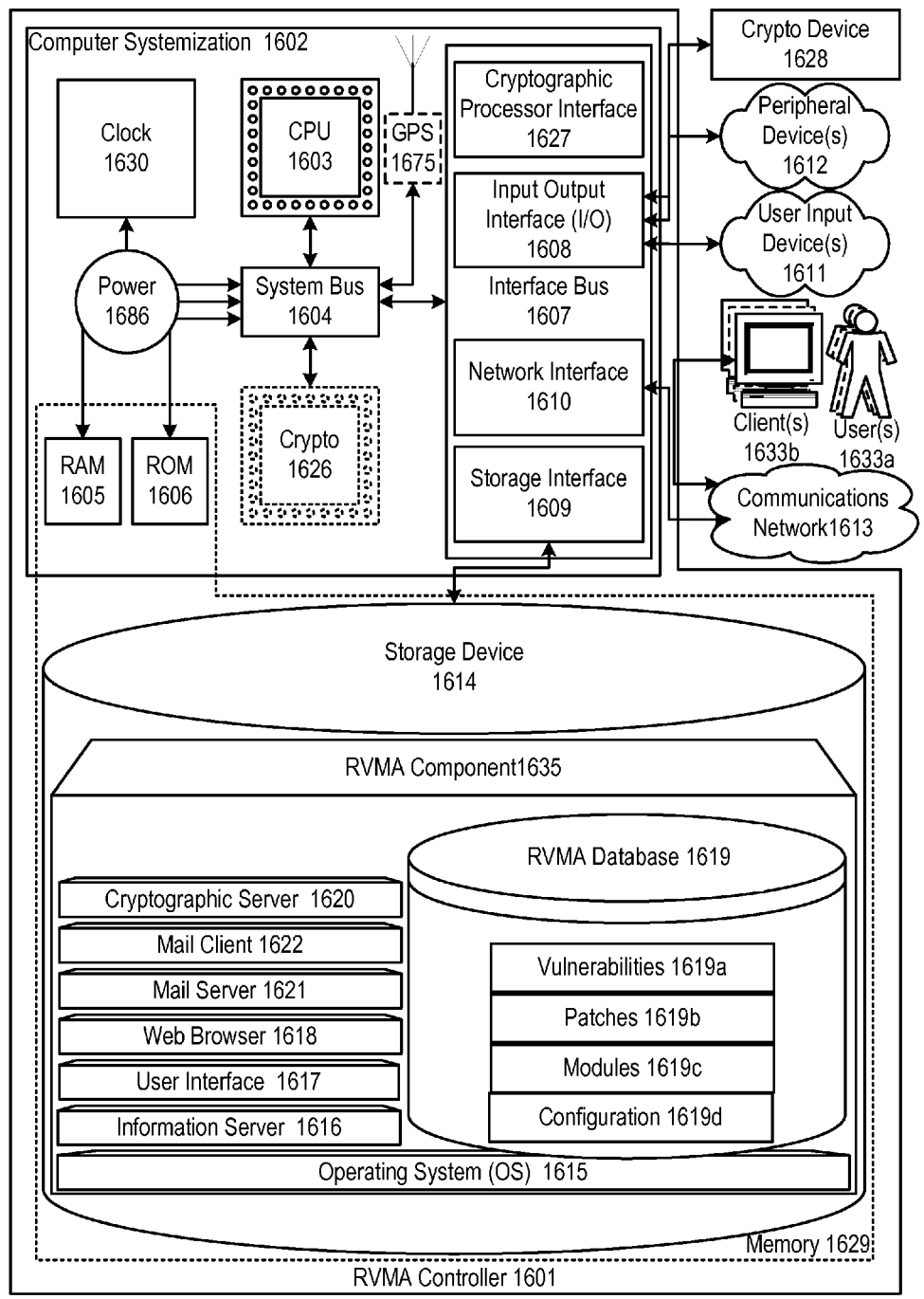
FIG. 16 is a block diagram illustrating embodiments of the RVMA controller.

FIG. 16 illustrates inventive aspects of a RVMA controller 1601 in a block diagram. In this embodiment, the RVMA controller 1601 may serve to aggregate, process, store, search, serve, identify, instruct, generate, match, and/or facilitate interactions with a computer through vulnerability management technologies, and/or other related data.

Typically, users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the RVMA controller 1610 may be connected to and/or communicate with entities such as, but not limited to: one or more users from user input devices 1611; peripheral devices 1612; an optional cryptographic processor device 1628; and/or a communications network 1613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RVMA controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor (s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effect communications, operations, storage, etc. Optionally, the computer systemization may be connected to an internal power source 1686. Optionally, a cryptographic processor 1626 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the RVMA controller and beyond through various interfaces. Should processing requirements dictate a greater amount speed and/or capacity, distributed processors (e.g., Distributed RVMA), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the RVMA may be achieved by implementing a microcontroller such as CAST's R8051XC2 microcontroller; Intel's MCS 51 (i.e., 8051 microcontroller); and/or the like. Also, to implement certain features of the RVMA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the RVMA component collection (distributed or otherwise) and/or features may be implemented via the microprocessor and/or via embedded components; e.g., via ASIC, coprocessor, DSP, FPGA, and/or the like. Alternately, some implementations of the RVMA may be implemented with embedded components that are configured and used to achieve a variety of features or signal processing.

Depending on the particular implementation, the embedded components may include software solutions, hardware solutions, and/or some combination of both hardware/software solutions. For example, RVMA features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the RVMA features. A hierarchy of programmable interconnects allow logic blocks to be interconnected as needed by the RVMA system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the RVMA may be developed on regular FPGAs and then migrated into a fixed version that more resembles ASIC implementations. Alternate or coordinating implementations may migrate RVMA controller features to a final ASIC instead of or in addition to FPGAs. Depending on the implementation all of the aforementioned embedded components and microprocessors may be considered the "CPU" and/or "processor" for the RVMA.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the RVMA thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the RVMA controller is accessible through remote clients 1633*b* (e.g., computers with web browsers) by users 1633*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed RVMA), architectures may similarly be employed to pool, load balance, and/or otherwise increase the communicative bandwidth required by the RVMA controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user input devices 1611, peripheral devices 1612, cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1611 may be card readers, dongles, finger print readers, gloves, graphics tablets, joysticks, keyboards, mouse (mice), remote controls, retina readers, trackballs, trackpads, touchpads, and/or the like.

Peripheral devices 1612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the RVMA controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the RVMA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the RVMA controller and/or a computer systemization may employ various forms of memory 1629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the RVMA component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the RVMA controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server)/7/8, Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RVMA controller to communicate with other entities through a communications network 1613. Various communication protocols may be used by the RVMA controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS)

resolution portion of an HTTP request is resolved to a particular information server, the information server resolves requests for information at specified locations on the RVMA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RVMA database 1619, operating systems, other program components, user interfaces, Web browsers, and/or the like.

Access to the RVMA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RVMA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RVMA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero)/8, Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the RVMA enabled nodes. The combined application may be nugatory on systems employing standard Web browsers.

Mail Server

A mail server component 1621 is a stored program component that is executed by a CPU 1603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the RVMA.

Access to the RVMA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RVMA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RVMA component to engage in secure transactions if so desired. The cryptographic component facilitates the secure accessing of resources on the RVMA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RVMA Database

The RVMA database component 1619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RVMA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the RVMA database is implemented as a data-structure, the use of the RVMA database 1619 may be integrated into another component such as the RVMA component 1635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1619 includes several tables, such as vulnerabilities table 319a, patch table 319b, and modules table 319c, and configuration table 319d. In one embodiment, the RVMA database may interact with other database systems. For example, employing a distributed database system, queries and data access by search RVMA component may treat the combination of the RVMA database, an integrated data security layer database as a single database entity.

In one embodiment, user programs may contain various user interface primitives, which may serve to update the RVMA. Also, various accounts may require custom database tables depending upon the environments and the types of clients the RVMA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619a-d. The RVMA may be configured to keep track of various settings, inputs, and parameters via database controllers.

The RVMA database may communicate to and/or with other components in a component collection, including itself, and/or facilities of the like. Most frequently, the RVMA database communicates with the RVMA component, other program components, and/or the like. The database may contain, retain, and provide information regarding other nodes and data.

The RVMAs

The RVMA component 1635 is a stored program component that is executed by a CPU. In one embodiment, the RVMA component incorporates any and/or all combinations of the aspects of the RVMA that was discussed in the previous figures. As such, the RVMA affects accessing, obtaining and the provision of information, services, transactions, and/or the like across various communications networks.

The RVMA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the RVMA server employs a cryptographic server to encrypt and decrypt communications. The RVMA component may communicate to and/or with other components in a component collection, including itself, and/or facilities of the like. Most frequently, the RVMA component communicates with the RVMA database, operating systems, other program components, and/or the like. The RVMA may contain, communicate, generate, obtain, and/or provide program component, system, user, and/or data communications, requests, and/or responses.

Distributed RVMAs

The structure and/or operation of any of the RVMA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the RVMA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

To address various issues related to, and improve upon, previous work, the application is directed to SELF-REPLICATING DISTRIBUTED VULNERABILITY MANAGEMENT AGENT APPARATUSES, METHODS, AND SYSTEMS. The entirety of this application shows by way of illustration various embodiments. The advantages and features disclosed are representative; they are not exhaustive or exclusive. They are presented only to assist in understanding and teaching the claimed principles. It should be understood that they are not representative of all claimed inventions. As such, certain aspects of the invention have not been discussed herein. That alternate embodiments may not have been presented for a specific portion of the invention or that further undescribed alternate embodiments may be available for a portion of the invention is not a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the invention. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functionality, features, logical aspects, organizational aspects, structural aspects, topological aspects, and other aspects of the disclosure are not to be considered limitations on the disclosure as defined by the claims or limitations on equivalents to the claims.

The invention claimed is:

1. A processor-implemented method for propagating a self-propelling distributed vulnerability management bot through a target network without user input, the method comprising:
scanning at least a portion of the target network to identify at least one node on the target network with at least one vulnerability;
exploiting the at least one vulnerability to install an implant of the self-propelling bot in memory on the at least one node;
instantiating a stager on the at least one node using the implant;
downloading a module from a vulnerability resource management server outside the target network using the stager;
installing the module in the memory on the at least one node to provide additional functionality to the implant;
detecting additional vulnerabilities on the at least one node using the downloaded module;
transmitting the additional vulnerabilities to the vulnerability resource management server;
downloading a patching module from the vulnerability resource management server;
installing the patching module in the memory on the at least one node; and
applying patches, using the patching module, to the at least one node to correct the at least one vulnerability and the additional vulnerabilities.

2. The method of claim 1, further comprising erasing all traces of the implant from the at least one node.

3. The method of claim 1, further comprising providing a user interface in communication with the vulnerability resource management server, the user interface being configured to allow a user to monitor the propagation of the self-propelling bot.

4. The method of claim 3, wherein the user interface is further configured to allow a user to define a spreading boundary that limits the propagation of the self-propelling bot through the target network.

5. The method of claim 3, wherein the user interface is further configured to allow a user to initiate a kill operation to instantaneously delete all implants of the self-propelling bot present in memory on the nodes in the target network.

6. The method of claim 1, further comprising providing at least one control post configured to provide redundancy and load balancing between the vulnerability resource management server and a plurality of implants on the target network.

7. The method of claim 6, further comprising providing at least one listening post configured to receive and send data between the at least one control post and the implants on the target network.

8. The method of claim 7, wherein the listening post is further configured to store data in a database and send stored data between the at least one control post and the implants at a predetermined interval.

9. The method of claim 8, wherein the implants comprise edge implants in communication with the at least one listening post through the internet and depth implants that are only in communication with other implants on the target network.

10. A system for propagating a self-propelling distributed vulnerability management bot through a target network without user input, the system comprising:
    a plurality of electronic devices configured to act as nodes on a target network, with at least a portion of the nodes being exploitable nodes;
    a vulnerability resource management server in communication with the target network;
    a plurality of implants of the self-propelled bot installed in memory on each of the exploitable nodes;
    at least one control post in communication with the vulnerability resource management server;
    at least one listening post communicatively disposed between the control post and the implants to form part of a communication channel between the implants and the vulnerability resource management server.

11. The system of claim 10, wherein the plurality of implants are each configured to instantiate a stager on at least one of the exploitable nodes, the stager being configured to download one or more modules from the vulnerability resource management server, wherein the modules are configured to provide additional functionality to the implant.

12. The system of claim 11, wherein the one or more modules includes a detection engine configured to detect vulnerabilities in the node where an implant is installed.

13. The system of claim 11, wherein the one or more modules includes a patching module configured to correct vulnerabilities present in the node.

14. The system of claim 10, wherein the implants comprise edge implants and depth implants, wherein the edge implants communicate directly with the listening post and other implants, and wherein the depth implants communicate only with other implants.

15. The system of claim 10, further comprising a user interface in communication with the vulnerability resource management server, the user interface being configured to allow a user to monitor the propagation of the self-propelling bot.

16. The system of claim 15, wherein the user interface is further configured to allow a user to define a spreading boundary that limits the extent to which the self-propelling bot can propagate through the target network.

17. The system of claim 15, wherein the user interface is further configured to allow a user to initiate a kill operation to instantaneously delete all implants of the self-propelling bot present in memory on the nodes in the target network.

18. The system of claim 10, wherein the control post is configured to provide redundancy and load balancing between the vulnerability resource management server and a plurality of implants on the target network.

19. The system of claim 10, wherein the listening post is further configured to store data in a database and send stored data between the at least one control post and the implants at a predetermined interval.

20. The system of claim 10, wherein the implants comprise edge implants in communication with the at least one listening post through the internet and depth implants that are only in communication with other implants on the target network.

21. The system of claim 10, wherein the implants are configured to communicate with each other through a peer-to-peer protocol.

22. A non-transitory computer-readable medium for propagating a self-propelling distributed vulnerability management bot through a target network without user input, the medium storing processor-issuable-and-generated instructions to:
    scan at least a portion of the target network to identify at least one node on the network with at least one vulnerability;
    exploit the at least one vulnerability to install an implant of the self-propelling bot in memory on the at least one node;
    instantiate a stager on the at least one node using the implant;
    download a module from a vulnerability resource management server outside the target network using the stager;
    install the module in the memory on the at least one node to provide additional functionality to the implant;
    detect additional vulnerabilities on the at least one node using the downloaded module;
    transmit the additional vulnerabilities to the vulnerability resource management server;
    download a patching module from the vulnerability resource management server, the patching module being configured to correct the at least one vulnerability and the additional vulnerabilities;
    install the patching module in the memory on the at least one node; and
    apply patches, using the patching module, to the at least one node to correct the at least one vulnerability and additional vulnerabilities.

* * * * *